United States Patent
Fukushima et al.

(10) Patent No.: US 7,817,106 B2
(45) Date of Patent: Oct. 19, 2010

(54) DISPLAY DEVICE, VIEWING ANGLE CONTROL DEVICE, AND ELECTRONIC APPARATUS

(75) Inventors: Hiroshi Fukushima, Yamatokoriyama (JP); Koji Yabuta, Kashiba (JP); Tomoo Takatani, Nara (JP)

(73) Assignee: Sharp Kabushiki Kaisha, Osaka (JP)

( * ) Notice: Subject to any disclaimer, the term of this patent is extended or adjusted under 35 U.S.C. 154(b) by 808 days.

(21) Appl. No.: 11/575,112

(22) PCT Filed: Sep. 9, 2005

(86) PCT No.: PCT/JP2005/016590

§ 371 (c)(1),
(2), (4) Date: Mar. 12, 2007

(87) PCT Pub. No.: WO2006/030702

PCT Pub. Date: Mar. 23, 2006

(65) Prior Publication Data

US 2008/0316198 A1 Dec. 25, 2008

(30) Foreign Application Priority Data

Sep. 15, 2004 (JP) ............................. 2004-268631

(51) Int. Cl.
*G09G 5/00* (2006.01)
*G09G 5/36* (2006.01)
(52) U.S. Cl. .......................................... 345/32; 349/96
(58) Field of Classification Search ................... 345/32, 345/4–9; 349/96
See application file for complete search history.

(56) References Cited

U.S. PATENT DOCUMENTS 4,626,851 A 12/1986 Tooze (Continued)

FOREIGN PATENT DOCUMENTS

JP 06-110403 A 4/1994

(Continued)

OTHER PUBLICATIONS

Official Communication for PCT Application No. PCT/JP2005/016590; mailed on Oct. 18, 2005.

(Continued)

*Primary Examiner*—Richard Hjerpe
*Assistant Examiner*—Jeffrey S Steinberg
(74) *Attorney, Agent, or Firm*—Keating & Bennett, LLP

(57) ABSTRACT

A portable phone has a main LCD and a SW-LCD, provided on a path of light to be transmitted by the main LCD, which electrically switches between (i) an image to be seen in a single image display mode and (ii) an image to be seen in a multiple image display mode. Furthermore, a first polarization plate serving as a reflective polarization plate is provided between the SW-LCD and the main LCD, and a second polarization plate is provided on a front surface side of the SW-LCD. The SW-LCD has a liquid crystal layer to which a voltage is applied in the multiple image display mode. With this, an image displayed by an image display can be seen from a front direction. In addition, the image displayed by the image display means is blocked by the second polarization plate when the image is seen from the an oblique direction, and outside light from the oblique direction is reflected by the first polarization plate, so that a mirror surface display is carried out.

7 Claims, 14 Drawing Sheets

U.S. PATENT DOCUMENTS

| | | | |
|---|---|---|---|
| 4,953,949 A * | 9/1990 | Dallas | 349/15 |
| 5,513,334 A | 4/1996 | Alexander | |
| 5,519,533 A * | 5/1996 | Nomura et al. | 359/478 |
| 5,638,082 A * | 6/1997 | Grimm | 345/6 |
| 5,642,214 A * | 6/1997 | Ishii et al. | 349/96 |
| 5,787,152 A | 7/1998 | Freadman | |
| 5,831,698 A | 11/1998 | Depp et al. | |
| 5,899,551 A * | 5/1999 | Neijzen et al. | 349/115 |
| 5,936,596 A | 8/1999 | Yoshida et al. | |
| 5,945,965 A * | 8/1999 | Inoguchi et al. | 345/6 |
| 6,205,554 B1 | 3/2001 | Sasaki et al. | |
| 6,330,001 B1 | 12/2001 | Nakao | |
| 6,373,457 B1 | 4/2002 | Kim et al. | |
| 6,411,326 B1 | 6/2002 | Tabata | |
| 6,414,910 B1 | 7/2002 | Kaneko et al. | |
| 6,445,434 B2 | 9/2002 | Takato et al. | |
| 6,473,078 B1 | 10/2002 | Ikonen et al. | |
| 6,518,939 B1 | 2/2003 | Kikuchi | |
| 6,525,707 B1 | 2/2003 | Kaneko et al. | |
| 6,556,267 B2 | 4/2003 | Koma | |
| 6,643,224 B1 | 11/2003 | Sekiguchi et al. | |
| 6,987,550 B2 | 1/2006 | Takato et al. | |
| 6,989,880 B2 | 1/2006 | Takato et al. | |
| 6,992,672 B1 | 1/2006 | Niikawa et al. | |
| 7,330,178 B2 | 2/2008 | Yorio et al. | |
| 7,397,521 B2 | 7/2008 | Yuuki et al. | |
| 7,486,350 B2 | 2/2009 | Yabuta et al. | |
| 2001/0015782 A1 | 8/2001 | Takato et al. | |
| 2001/0026330 A1 | 10/2001 | Oh | |
| 2001/0043297 A1 | 11/2001 | Arai | |
| 2002/0180922 A1 | 12/2002 | Takato et al. | |
| 2003/0007227 A1 | 1/2003 | Ogino | |
| 2003/0053033 A1 | 3/2003 | Vrachan et al. | |
| 2003/0146893 A1 | 8/2003 | Sawabe | |
| 2003/0147112 A1 | 8/2003 | Mukawa | |
| 2003/0195421 A1 | 10/2003 | Demers et al. | |
| 2004/0033812 A1 | 2/2004 | Matsunaga et al. | |
| 2004/0046909 A1 | 3/2004 | Sekiguchi | |
| 2004/0066363 A1 | 4/2004 | Yamano et al. | |
| 2004/0085353 A1 | 5/2004 | Kawakami et al. | |
| 2004/0100598 A1 | 5/2004 | Adachi et al. | |
| 2004/0100604 A1 | 5/2004 | Takato et al. | |
| 2004/0185920 A1 | 9/2004 | Choi et al. | |
| 2004/0207594 A1 | 10/2004 | Kubo | |
| 2004/0233360 A1 | 11/2004 | Yoshida et al. | |
| 2004/0252258 A1 | 12/2004 | Matsushima | |
| 2004/0252679 A1 | 12/2004 | Williams et al. | |
| 2005/0001796 A1 | 1/2005 | Liu | |
| 2005/0020325 A1 | 1/2005 | Enger et al. | |
| 2005/0143124 A1 | 6/2005 | Kennedy et al. | |
| 2005/0146664 A1 | 7/2005 | Hanaoka et al. | |
| 2005/0215291 A1 | 9/2005 | McDonald | |
| 2005/0243265 A1 | 11/2005 | Winlow et al. | |
| 2005/0270449 A1 | 12/2005 | Koma et al. | |
| 2005/0286000 A1 | 12/2005 | Tsai et al. | |
| 2006/0012614 A1 | 1/2006 | Asao et al. | |
| 2006/0061717 A1 | 3/2006 | Ichihashi | |
| 2006/0066794 A1 | 3/2006 | Hotta et al. | |
| 2007/0057792 A1 | 3/2007 | Alden | |
| 2008/0042954 A1 | 2/2008 | Lee et al. | |
| 2008/0143940 A1 | 6/2008 | Yoshida et al. | |
| 2009/0310044 A1 | 12/2009 | Lee | |

FOREIGN PATENT DOCUMENTS

| | | |
|---|---|---|
| JP | 08-114795 A | 5/1996 |
| JP | 08-136909 A | 5/1996 |
| JP | 09-105958 A | 4/1997 |
| JP | 10-153968 A | 6/1998 |
| JP | 10-240186 A | 9/1998 |
| JP | 10-319373 A | 12/1998 |
| JP | 11-007045 A | 1/1999 |
| JP | 11-174489 A | 7/1999 |
| JP | 11-223680 A | 8/1999 |
| JP | 2001-264768 A | 9/2001 |
| JP | 2001-318374 A | 11/2001 |
| JP | 2001-344050 A | 12/2001 |
| JP | 2003-015535 A | 1/2003 |
| JP | 2003-099192 A | 4/2003 |
| JP | 2003-298715 A | 10/2003 |
| JP | 2004-038035 A | 2/2004 |
| JP | 2004-062094 A | 2/2004 |
| JP | 2004-133334 A | 4/2004 |
| JP | 2004-233527 A | 8/2004 |
| JP | 2004-279793 A | 10/2004 |
| JP | 2005-260858 A | 9/2005 |
| JP | 2005-292586 A | 10/2005 |
| JP | 2005-316470 A | 11/2005 |
| JP | 2005-345799 A | 12/2005 |
| JP | 2006-003754 A | 1/2006 |
| JP | 2006-011451 A | 1/2006 |
| JP | 2006-064882 A | 3/2006 |
| JP | 2006-098784 A | 4/2006 |
| KR | 2000-0039870 A | 7/2000 |
| KR | 2003-0040345 A | 5/2003 |
| WO | 95/27919 A2 | 10/1995 |

OTHER PUBLICATIONS

Official Communication for PCT Application No. PCT/JP2005/015680; mailed on Oct. 25, 2005.

Official Communication for PCT Application No. PCT/JP2005/015661; mailed on Oct. 25, 2005.

Akira Imai et al.; "Display Control Device, Display Apparatus, Method of Controlling Display Device, Display Control Program, and Storage Medium Storing the Program"; U.S. Appl. No. 11/574,371, filed Feb. 27, 2007.

Akira Imai et al.; "Viewing-Angle Control Device, Display Apparatus, Method for Controlling Viewing-Angle Control Device, Viewing-Angle Control Program, and Storage Medium Storing the Program"; U.S. Appl. No. 11/574,375, filed Feb. 27, 2007.

Tomoo Takatani et al.; "Display Device, Viewing Angle Control Device, and Electronic Apparatus"; U.S. Appl. No. 11/574,609, filed Mar. 2, 2007.

Official Communication for PCT Application No. PCT/JP2005/016003; mailed on Oct. 11, 2005.

Koji Yabuta et al.; "Display Device, Viewing Angle Control Device, and Electronic Device"; U.S. Appl. No. 11/575,244, filed Mar. 14, 2007.

Koji Yabuta et al.; "Display Device and Electronic Apparatus", U.S. Appl. No. 11/576,555, filed Apr. 3, 2007.

Yabuta et al., "Display Apparatus and Electronics Device", U.S. Appl. No. 11/525,033, filed Sep. 22, 2006.

Official Communication issued in corresponding U.S. Appl. No. 11/525,033, mailed on Jan. 20, 2010.

Official Communication issued in corresponding U.S. Appl. No. 11/574,371, mailed on Jan. 12, 2010.

Official Communication issued in corresponding U.S. Appl. No. 11/574,375, mailed on Jan. 12, 2010.

Official Communication issued in corresponding U.S. Appl. No. 11/574,609, mailed on Dec. 8, 2009.

* cited by examiner

→ RUBBING DIRECTION OF ORIENTING FILM 24
--→ RUBBING DIRECTION OF ORIENTING FILM 25
↔ TRANSMISSION AXIS OF SECOND POLARIZATION PLATE 11
←--→ TRANSMISSION AXIS OF FIRST POLARIZATION PLATE 13

DISPLAY DEVICE, VIEWING ANGLE CONTROL DEVICE, AND ELECTRONIC APPARATUS

BACKGROUND OF THE INVENTION

1. Field of the Invention

The present invention relates to a display device and a viewing angle control device. Particularly, the present invention relates to a display device and a viewing angle control device each of which makes it possible to switch to a mode in which an image to be seen is changed in accordance with a viewing direction.

2. Description of the Related Art

In recent years, electronic apparatuses have become lighter and lighter, so that an electronic apparatus, such as a portable phone or a mobile personal computer, which has a display can be taken out to and used in a public place. This has caused such a problem that a confidential document or information that a user wishes to individually browse is seen by a person near the user.

In response to this problem, there has been proposed a display device which can be set in a wide viewing angle display mode under normal conditions and which can be switched to a narrow viewing angle display mode when taken out to and used in a public place. The narrow viewing angle mode refers to a mode in which a user right in front of a display can see a normal display image and in which a plain image or another image is seen from an oblique direction. Further, by making it possible to switch to the wide viewing angle display mode, it is possible to deal with a situation where a wide viewing angle is required, e.g., where a shot image needs to be seen by a large number of people.

Examples of a part for carrying out such a display include a viewing angle variable element disclosed in Japanese Unexamined Patent Application No. 105958/1997 (Tokukaihei 9-105958; published on Apr. 22, 1997). According to the viewing angle variable element, a narrow viewing angle is obtained when liquid crystal molecules of a liquid-crystal layer provided between a pair of substrates are oriented in a direction perpendicular to the substrates, and a wide viewing angle is obtained when the liquid crystal molecules are oriented in a direction parallel to the substrates. Further, Japanese Unexamined Patent Application No. 62094/2004 (Tokukai 2004-62094; published on Feb. 26, 2004) describes viewing angle changing means for changing a viewing angle of information means by changing the orientation of liquid crystals provided between two glass plates.

Furthermore, there is a display device arranged so as to be divided into several zones, for, example, in which liquid crystals are oriented in different directions. With this arrangement, in cases where a display is seen from a direction other than the front direction in a narrow viewing angle mode, an image different from an image shown by the display can be seen. For example, Japanese Unexamined Patent Application No. 264768/2001 (Tokukai 2001-264768; published on Sep. 26, 2001) discloses a liquid crystal display device in which orienting films sandwiching liquid crystals therebetween are divided into a plurality of regions and in which the regions adjacent to one another have different directions of orientation. Further, Japanese Unexamined Patent Application No. 38035/2004 (Tokukai 2004-38035; published on Feb. 5, 2004) discloses a liquid crystal display device in which first and second liquid crystal cells having different viewing directions are alternately provided.

According to the arrangement of Tokukaihei 9-105958, the narrow viewing angle mode is set when the reflectance is changed by vertically orienting the liquid crystal molecules. However, such viewing angle control using the reflectance makes it difficult to retain image display quality.

Further, although Tokukai 2004-62094 teaches that the viewing angle of the display is controlled by changing the orientation of the liquid crystals, but fails to teach how to change the orientation of the liquid crystals. Therefore, viewing angle control cannot be realized.

Furthermore, the arrangement of Tokukai 2001-264768 teaches that a fixed pattern irrelevant to a display signal is seen from a direction other than the front direction. However, because of the structure, the pattern has its black and white reversed depending on whether it is seen from the right or left. Therefore, a display image cannot be appropriately hidden when the display image is seen from a direction other than the front direction. That is, when the pattern has a large non-transmission region in cases where the pattern is seen from the right, the pattern has a large transmission region in cases where the pattern is seen from the left. Therefore, the only way to hide the screen image when it is seen from both the right and left is to reduce the visibility of the screen image by covering the screen image with an image having transmission and non-transmission regions in a fifty-fifty proportion (e.g., an image patterned with hound's teeth checks). Further, such an image having transmission and non-transmission regions in a fifty-fifty proportion has too large a transmission region to hide the screen image, so that a sufficient visibility prevention effect cannot be obtained.

Further, according to the arrangement of Tokukai 2004-38035, a large number of small liquid crystal cells are arrayed on a substrate. However, such a liquid crystal display device has a complex arrangement, and therefore is difficult to manufacture.

As described above, there has been unknown a simply arranged display device, exhibiting high display quality, which makes it possible to switch to a mode in which a display image can be appropriately hidden when the display image is seen from an oblique direction.

SUMMARY OF THE INVENTION

The present invention has been made in order to solve the foregoing problems, and it is an object of the present invention to realize a display device which has a simple arrangement, which retains display quality, and which makes it possible to switch to a mode in which a display image is hidden when the display is seen from a specific direction.

In order to attain the foregoing object, a display device according to the present invention is a display device, including: image display means for displaying an image; and display switching means, provided on a front surface side of the image display means, for electrically switching between (i) an image to be seen in a single image display mode and (ii) an image to be seen in a multiple image display mode, the display switching means being a liquid crystal layer provided between a pair of substrates, the display switching means further including (a) first polarizing means provided between the display switching means and the image display means and (b) second polarizing means provided on a front surface side of the display switching means, the first polarizing means being a reflective polarization plate.

According to the foregoing arrangement, in the multiple image display mode (narrow viewing angle mode), the image displayed by the image display means passes through the first and second polarizing means, so that the image is observable when it is seen from the front direction. When the image is seen from an oblique direction, the image can be blocked by the second polarizing means.

Further, on this occasion, outside light coming from an oblique direction can be reflected by the second polarizing means serving as a reflective polarization plate. Therefore, in the multiple image display mode (narrow viewing angle mode), a mirror surface display can be carried out with respect to the line of sight extending from an oblique direction.

Further, a viewing angle control device of the present invention is a viewing angle control device in which outputting is carried out by controlling a viewing angle of incident light, the viewing angle control device, including: a liquid crystal element which includes a liquid crystal layer provided between a pair of substrates; first polarizing means provided on a back surface side of the liquid crystal element; and second polarizing means provided on a front surface side of the liquid crystal element, the liquid crystal element having liquid crystal molecules whose long axis direction is included in a surface defined by a transmission axis or an absorption axis of the linear polarization plate and a light traveling direction, the liquid crystal molecules being able to be (a) in a state of being substantially perpendicular or substantially parallel to the light traveling direction or (b) in a state of being tilted with respect to the light traveling direction, the first polarizing means being a reflective polarization plate.

A display device having functions such as those described above can be obtained by attaching such a viewing angle control device to a commonly-used display device.

An electronic apparatus of the present invention includes such a display device or such a viewing angle control device.

This makes it possible to realize an electronic apparatus which has a simple arrangement, which retains display quality, and which makes it possible to switch to a mode in which a display image is hidden when the display image is seen from a specific direction.

Additional objects, features, and strengths of the present invention will be made clear by the description below. Further, the advantages of the present invention will be evident from the following explanation in reference to the drawings.

BRIEF DESCRIPTION OF THE DRAWINGS

FIG. 5(a) is a diagram showing a display surface of the display section as the viewer faces. FIG. 5(b) is a cross-sectional view taken along the line A-A'. FIG. 5(c) is a cross-sectional view taken along the line B-B'.

FIG. 6(a) is a diagram showing a case where one of the transparent electrode films has been subjected to electrode patterning, and FIG. 6(b) is a diagram showing a case where both of the transparent electrode films have been subjected to electrode patterning.

FIG. 7(a) is a cross-sectional view taken along the line A-A'. FIG. 7(b) is a cross-sectional view taken along the line B-B'.

FIG. 8(a) is a cross-sectional view taken along the line A-A'. FIG. 8(b) is a cross-sectional view taken along the line B-B'.

FIG. 9(a) is a diagram showing a display surface of the display section as the viewer faces. FIG. 9(b) is a cross-sectional view taken along the line A-A'. FIG. 9(c) is a cross-sectional view taken along the line B-B'.

FIG. 10(a) is a cross-sectional view taken along the line A-A'. FIG. 10(b) is a cross-sectional view taken along the line B-B'.

FIG. 11(a) is a cross-sectional view taken along the line A-A'. FIG. 11(b) is a cross-sectional view taken along the line B-B'.

DETAILED DESCRIPTION OF THE PREFERRED EMBODIMENTS

An embodiment of the present invention will be described below with reference to the drawings.

Figure 2:
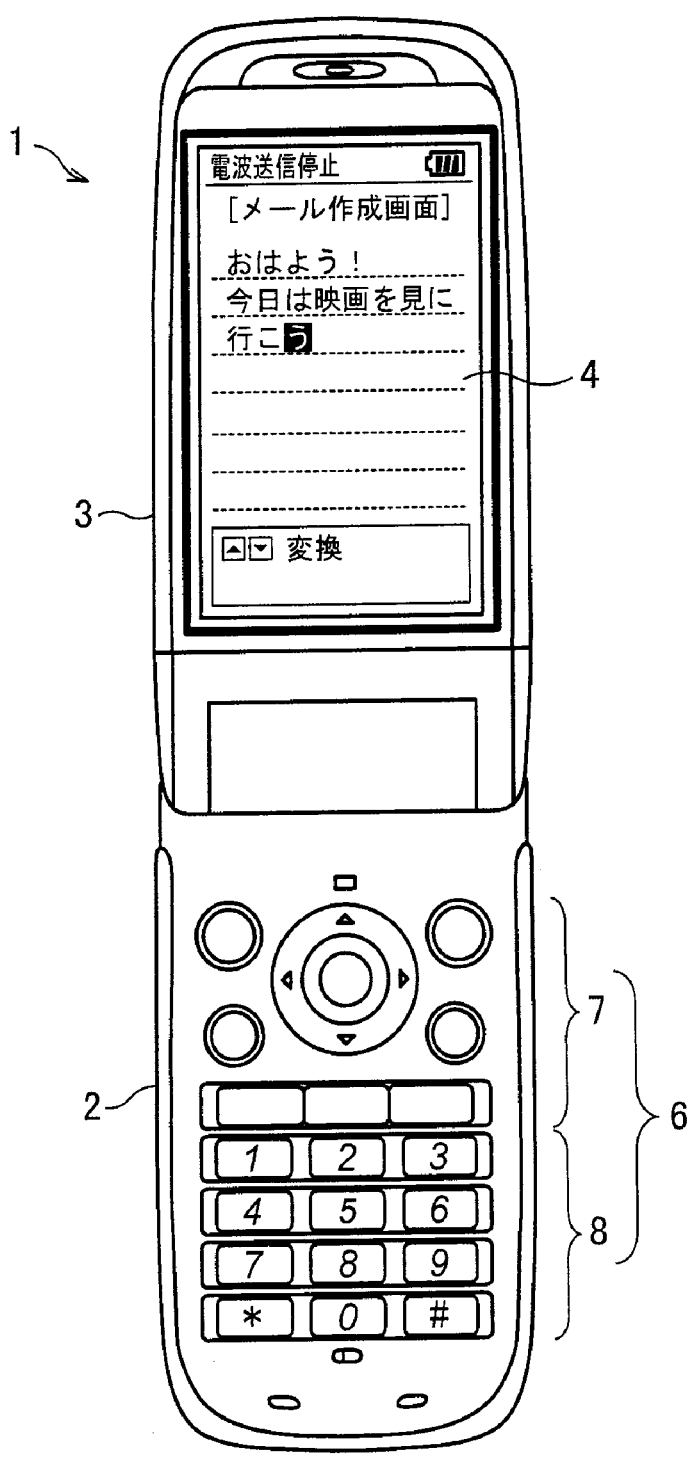
FIG. 2 is a diagram showing the portable phone according to the embodiment of the present invention.

FIG. 2 shows an appearance of a portable phone (electronic apparatus) 1 according to an embodiment of the present invention. The portable phone 1 of the present embodiment is a so-called clamshell type, and FIG. 2 shows the portable phone 1 that is opened. FIG. 2 shows a portion that becomes an inner side when the portable phone 1 is closed, and this portion is a side mainly used by the user when the portable phone 1 is opened. Accordingly, the present invention assumes that the side shown in FIG. 2 is a front side.

As shown in FIG. 2, the portable phone 1 includes a main body 2 and a lid body 3, and the main body 2 and the lid body 3 are connected to each other in a hinge manner. The lid body 3 has its front side provided with a display section (display device) 4.

The main body 2 has its front side provided with a main operation button group 6. The main operation button group 6 includes a function button group 7 for carrying various setting and function switching in the portable phone 1 and an input button group 8 for inputting symbols such as numbers and characters. Specifically, the function button group 7 includes a power button for switching on and off the portable phone, a camera button for launching a camera mode, a mail button for launching a mail mode, a cross button for moving a target of selection up and down and from side to side, a decision button, provided in the center of the cross button, for deciding on various selections, and other buttons. Further, the input button group 8 is a numeric pad.

According to the portable phone 1 of the present invention, while the display section 4 shows the user a main image such as a message body or a shot image, the display section 4 shows another image to people around the user. Hereinafter, the mode in which the message body or the shot image becomes unable to be seen from the people around the user is referred to as "narrow viewing angle mode (multiple image display mode)", and a normal mode in which a display carried out by the display section 4 can be seen from any angle is referred to as "wide viewing angle mode (single image display mode)". The user can arbitrarily switch between the narrow viewing angle mode and the wide viewing angle mode by using an operation button.

Figure 3:
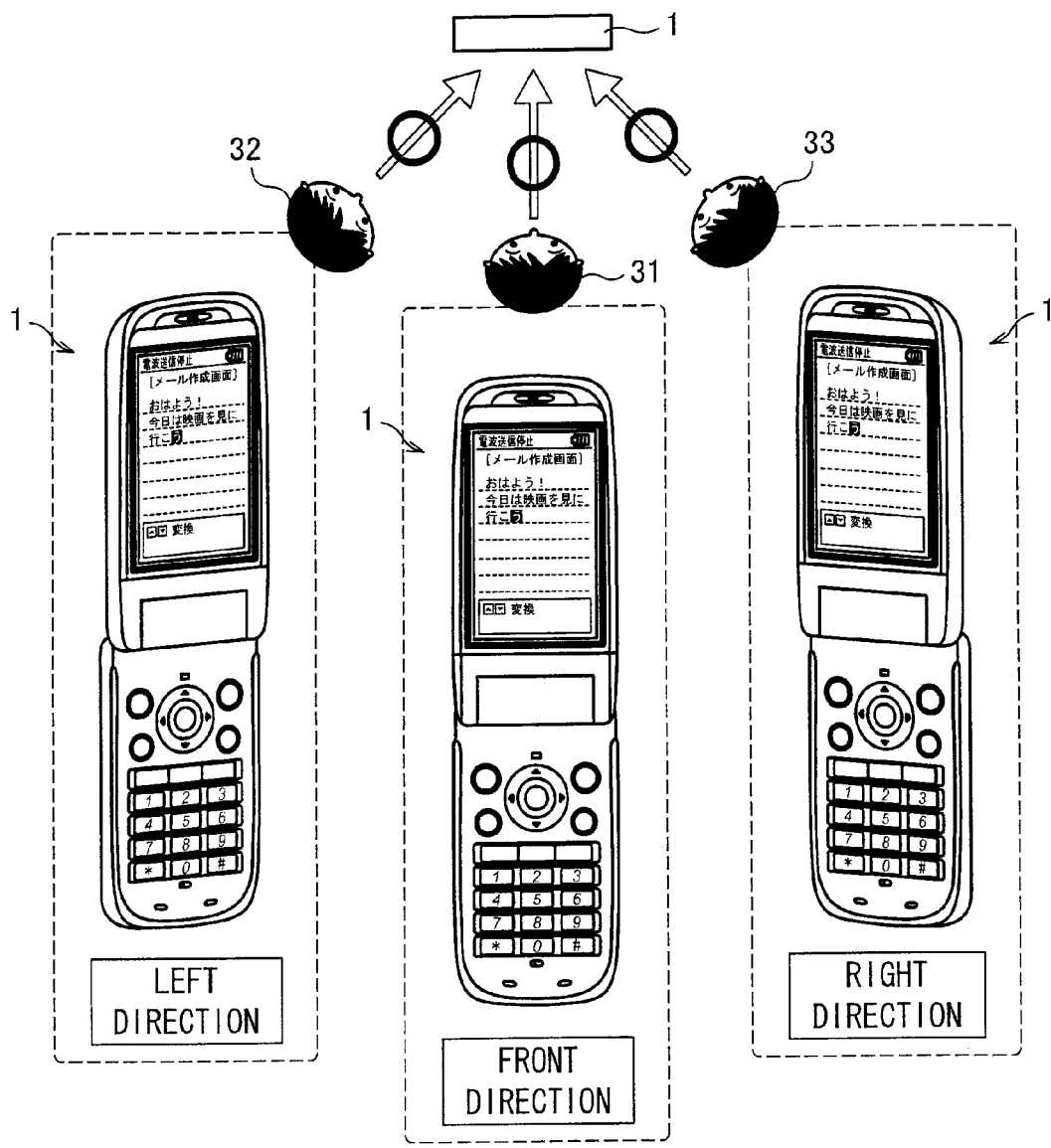
FIG. 3 is a diagram showing the display section seen from the front direction or an oblique direction, the portable phone according to the embodiment of the present invention being set in a single image display mode.

As shown in FIG. 3, in the wide viewing angle mode, the main image is seen in cases where the display section 4 is seen right from the front (front direction), where the display section 4 is obliquely seen from the right as the user faces the display section 4 (right direction), and where the display section 4 is obliquely seen from the left as the user faces the display section 4 (left direction).

Figure 4:
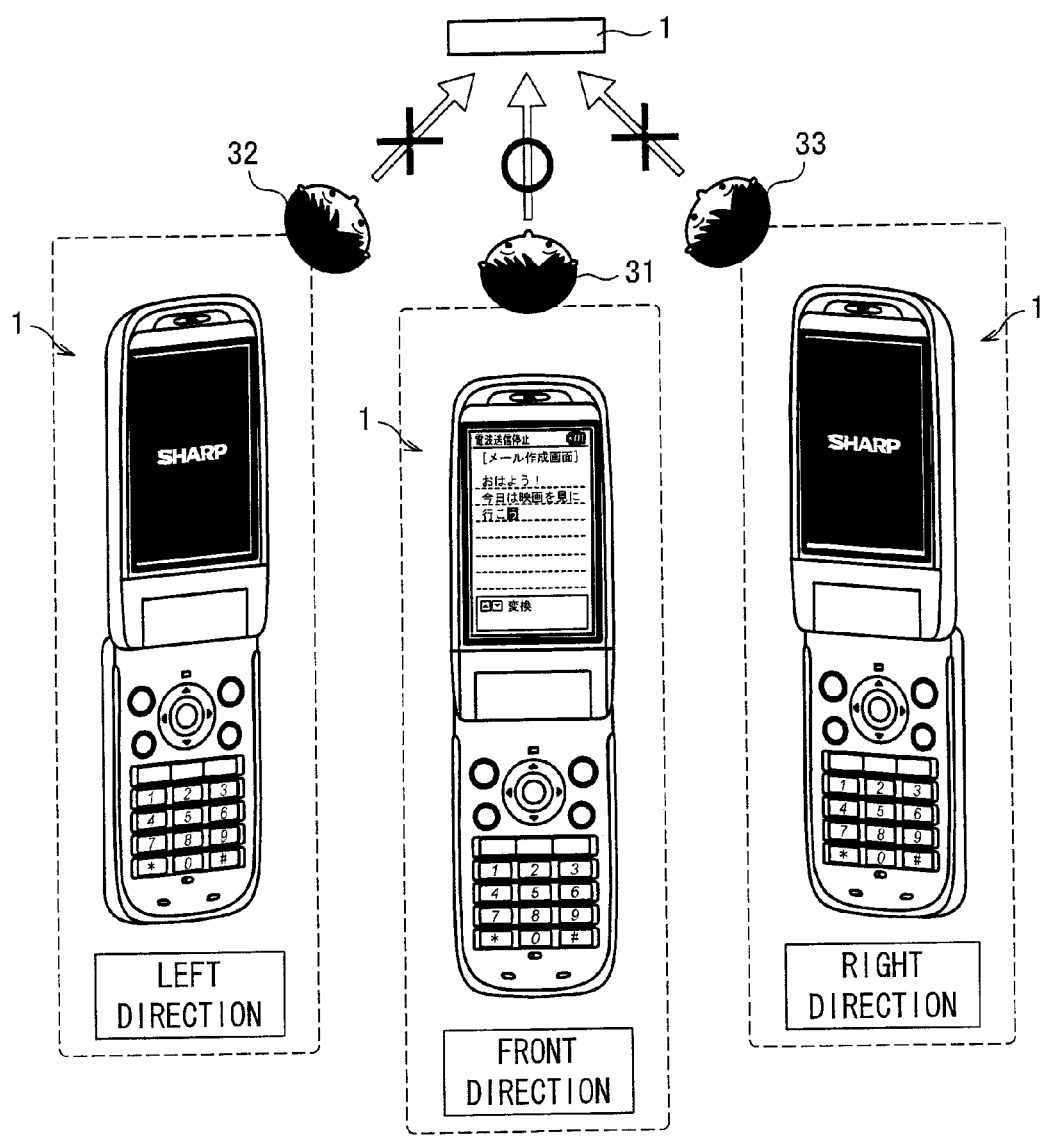
FIG. 4 is a diagram showing the display section 4 seen from the front direction or an oblique direction, the portable phone according to the embodiment of the present invention being set in a multiple image display mode.

On the other hand, as shown in FIG. 4, in the narrow viewing angle mode, although the main image is seen from the front direction, an image such as that obtained by superimposing, on the main image, a switching image whose non-transmission region has a logo "SHARP" therein is seen from the right or left direction. Instead of displaying the switching image having a logo or the like therein, a switching image whose whole area is a non-transmission region may be displayed.

The following explains a detailed arrangement of the display section 4.

Figure 1:
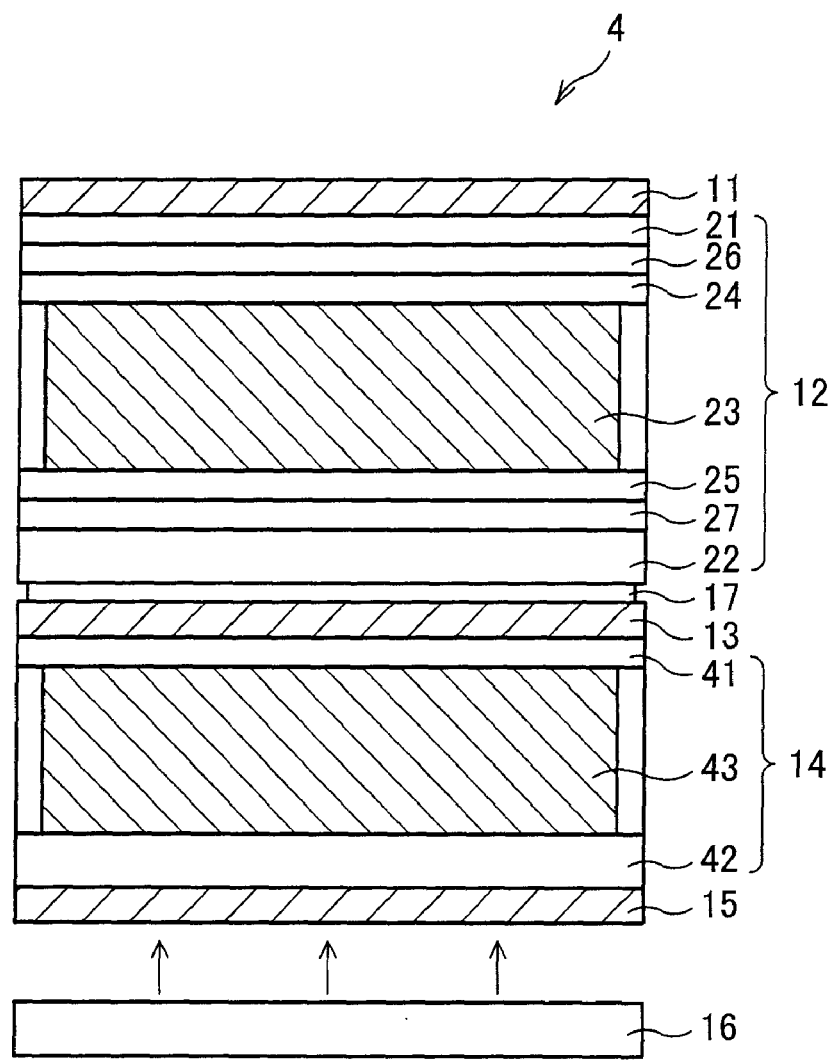
FIG. 1 is a cross-sectional view of a display section of a portable phone according to an embodiment of the present invention.

FIG. 1 is a cross-sectional view of the display section 4. The display section 4 includes a second polarization plate (second polarizing means, linear polarization plate) 11, a switching liquid crystal display section (display switching means, liquid crystal element; hereinafter referred to as "SW-LCD") 12, a first polarization plate (first polarizing means) 13, a main liquid crystal display section (image display means; hereinafter referred to as "main LCD") 14, and a third polarization plate 15 that are laminated in this order, and includes a backlight 16 provided on a side of the third polarization plate 15.

Here, it is preferable that the first polarization plate 13 be set to have a polarization transmission axis parallel to that of the second polarization plate 11. However, the first polarization plate 13 possibly has any axial angle in accordance with the characteristics required of the main LCD.

In this case, the direction of polarization of linear polarized light emitted from the first polarization plate 13 set to have a given axial angle is rotated appropriately with the use of a λ/2 plate or the like so as to corresponds to the transmission axis of the second polarization plate 11. This makes it possible to obtain the same effects as those obtained when the polarization transmission axis of the first polarization plate 13 is set to be parallel to that of the second polarization plate 11.

The second polarization plate 11 is pasted to the SW-LCD 12. The first polarization plate 13 and the third polarization plate 15 are pasted to both surfaces of the main LCD 14, respectively. A side of the SW-LCD 12 to which side the second polarization plate 11 is not pasted and the main LCD are joined to each other via the first polarization plate 13 with an adhesive section 17. Moreover, the SW-LCD 12 to which the second polarization plate 11 has been pasted functions as a viewing angle control device. Further, the adhesive section 17 may be joined with a heat- or ultraviolet-curable resin adhesive or may be fixed with a so-called double-sided tape. Further, all or part (e.g., a frame portion) of the adhesive section 17 may be a pasting region.

In the main LCD 14, a pair of transparent electrode substrates 41 and 42 sandwiches a liquid crystal layer 43 therebetween. The orientation of liquid crystal molecules of the liquid crystal layer 43 is changed by applying a voltage to the transparent electrode substrates 41 and 42 in accordance with a control section (not shown). With this, an image is displayed. The main LCD 14 is controlled by the control section (not shown) so as to display an image such as an operation screen of the portable phone 1, a picture, or a message body. Examples of the main LCD 14 include a commonly-known liquid crystal display device. For example, it is possible to use a liquid crystal display device of any mode, such as a TN (twisted-nematic) mode liquid crystal display device that is driven using an active-matrix driving method or a liquid crystal display device using a VA (vertical-alignment) mode display method. Further, instead of the main liquid crystal display section 14, a self-luminous display such as an organic EL (electroluminescence) display device or a plasma display device may be used. No backlight is needed in cases where the self-luminous display is used.

The SW-LCD 12 includes a substrate 21, a transparent electrode film 26, an orienting film 24, a liquid crystal layer 23, an orienting film 25, a transparent electrode film 27, and a substrate 22 that are formed in this order. The direction of initial orientation of liquid crystal molecules of the liquid crystal layer 23 is determined in accordance with the orienting films 25 and 27, and the direction of orientation is changed in accordance with a voltage applied to the transparent electrodes 26 and 27 by the control section (not shown). Moreover, the narrow viewing angle mode and the wide viewing angle mode are switched back and forth in accordance with the change in direction of orientation.

The liquid crystal layer 23 is provided between the substrates 21 and 22. The orientation of the liquid crystal molecules of the liquid crystal layer 23 is changed by applying a voltage to the transparent electrode films 26 and 27 in accordance with the control section (not shown). With this, an image is displayed. The control section changes the direction of orientation of the liquid crystal molecules of the liquid crystal layer 23 for the wide viewing angle mode or for the narrow viewing angle mode in accordance with whether the user has set the wide viewing angle more or the narrow viewing angle mode.

The backlight 16 supplies light for use in a display. The third polarization plate 15 extracts linear polarized light having a fixed polarization direction from light having been emitted from the backlight 16 and having not been incident on the main LCD 14. The first polarization plate 13 extracts linear polarized light having a fixed polarization direction from light having passed through the main LCD 14 and having not been incident on the SW-LCD 12. The second polarization plate 11 extracts linear polarized light having a fixed polarization direction from backlight having passed through the main LCD 14 and the SW-LCD 12.

The following explains a change in orientation of the liquid crystal molecules of the SW-LCD with reference to FIGS. 5 through 11. Specifically, the following explains four examples of the orientation of the liquid crystal molecules of the SW-LCD.

Example 1 of the Orientation of the Liquid Crystal Molecules of the SW-LCD

Figure 5:
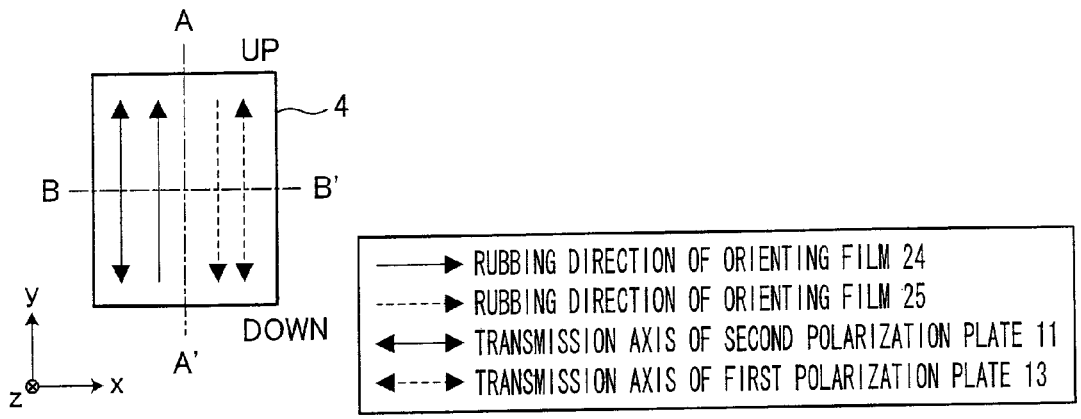
FIGS. 5(a) to 5(c) show the display section of the portable phone, according to the embodiment of the present invention, set in the single image display mode.
Figure 5:
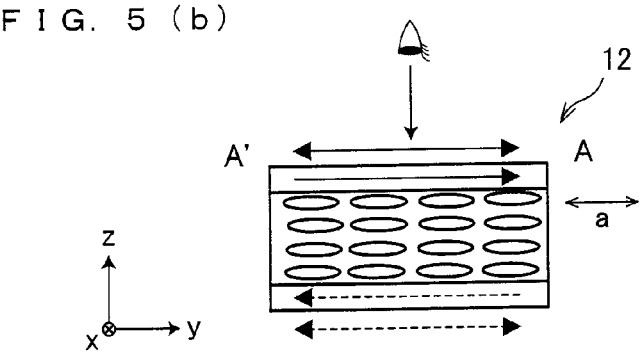
Figure 5:
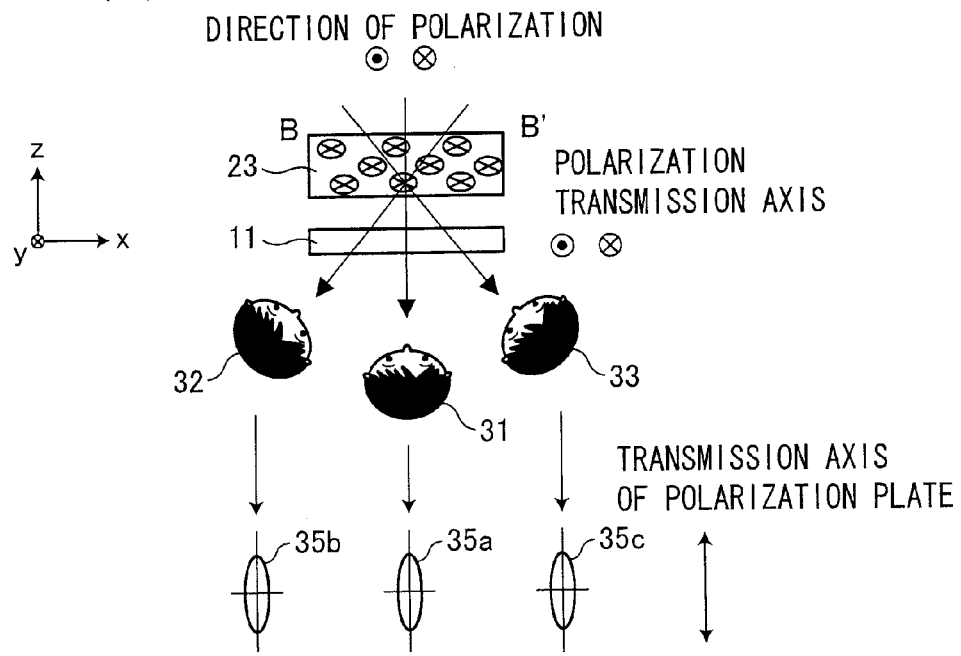
Figure 6:
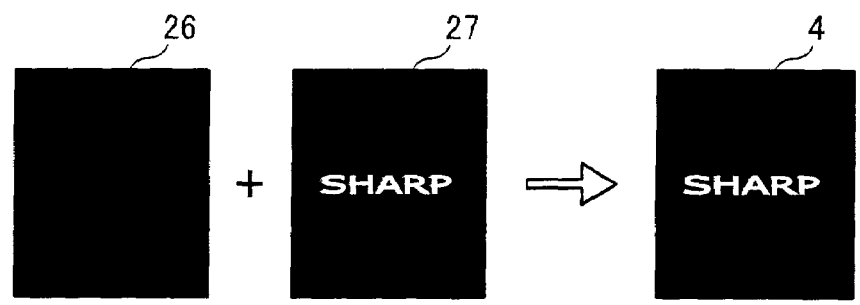
FIGS. 6(a) and 6(b) are diagrams showing transparent electrode films provided in the display section according to the embodiment of the present invention.
Figure 6:
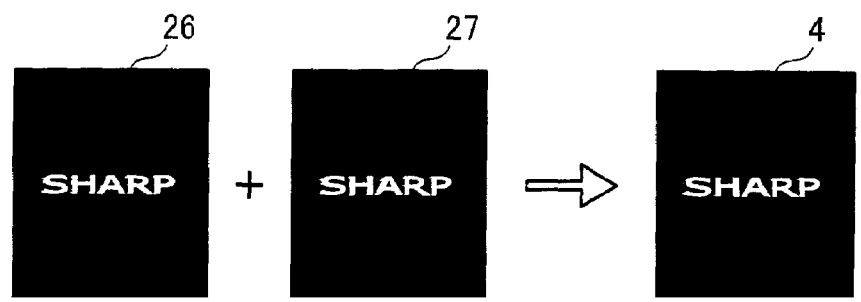

FIG. 5(a) shows a display surface of the display section 4 of the portable phone 1 so that the upper and lower sides of an image displayed by the main LCD 14 respectively correspond to the upper and lower sides of the page. Hereinafter, the right-and-left and up-and-down directions on the display screen are respectively referred to as "x direction" and "y direction", and the direction of thickness of the display section 4 is referred to as "z direction". Further, in FIGS. 5 through 11, the transparent electrode films 26 and 27 and the orienting films 24 and 25 are omitted.

First, as shown in FIG. 5(a), the second polarization plate 11 and the first polarization plate 13 are provided so as to have respective polarization transmission axes extending in the y direction. Further, the respective rubbing directions of the orienting films 24 and 25 are set to be parallel to the respective polarization transmission axes of the first and second polarization plates 13 and 11 so as to be reversed 180° with respect to each other. That is, the orienting films 24 and 25 are oriented in such directions as to form an antiparallel structure. Moreover, the orienting films 24 and 25 is made of a horizontal alignment polyimide material so that the liquid crystal molecules are so oriented as to be substantially parallel to the substrates 21 and 22. With this, the liquid crystal molecules are uniaxially oriented so as to have a long axis direction substantially parallel to the polarization transmission axes.

In this case, as shown in FIG. 5(b), which is a cross-sectional view taken along the line A-A', when no voltage is applied, the liquid crystal molecules of the SW-LCD 12 are uniaxially oriented so as to be substantially parallel to the polarization transmission axis of the first polarization plate 13. Light incident on the SW-LCD 12 after having been emitted from the backlight 16 and having passed through the main LCD 14 passes through the first polarization plate 13. Therefore, the direction of polarization of the light incident on the SW-LCD 12 substantially corresponds to the direction of orientation a of the liquid crystal molecules.

FIG. 5(c) shows the way the liquid crystal molecules look when the SW-LCD 12 to which no voltage is applied is obliquely seen from the x direction. As shown in FIG. 5(c), a shape obtained by projecting each of the liquid crystal molecules as seen from the front direction (a shape of each of the liquid crystal molecules as seen from an observer 31) is similar to that of a liquid crystal molecule 35a, and the liquid crystal molecule 35a has a long axis direction substantially corresponding to the direction of polarization of the incident light. In cases where the angle between the long axis direction of the projection drawing of the liquid crystal molecule and the direction of polarization of the incident light is 0°, the incident light is transmitted without the influence of birefringence. Therefore, in this case, the image displayed by the main LCD 14 can be seen as it is. Similarly, a shape obtained by projecting each of the liquid crystal molecules as obliquely seen from the x direction is similar to those of liquid crystals 35b and 35c, and each of the liquid crystal molecules 35b and 35c has a long axis direction substantially corresponding to the direction of polarization of the incident light. Therefore, the image displayed by the main LCD 14 can be seen. That is, the image displayed by the main LCD 14 can be seen from any direction. This state, in which no voltage is applied, is set as the wide viewing angle mode.

On the other hand, in the narrow viewing angle mode, an AC voltage (e.g., a voltage of 100 Hz and 3 V) is applied to the transparent electrode films 25 and 26, to which no voltage is applied, so that the liquid crystal molecules are rotated on the axis of the x direction so as to be tilted at 45° to the substrates 21 and 22. FIGS. 7(a) and 7(b) show the way the liquid crystal molecules look on this occasion. FIG. 7(a) is a cross-sectional view taken along the line A-A', and shows that the liquid crystal molecules are tilted at 45° to the substrates 21 and 22. FIG. 7(b) is a cross-sectional view taken along the line B-B', and shows that the liquid crystal molecules are tilted at approximately 45° with respect to the normal of the page.

Figure 7:
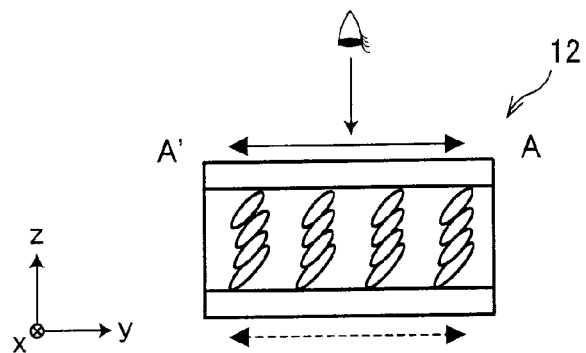
FIGS. 7(a) and 7(b) show the display section of the portable phone, according to the embodiment of the present invention, set in the multiple image display mode.
Figure 7:
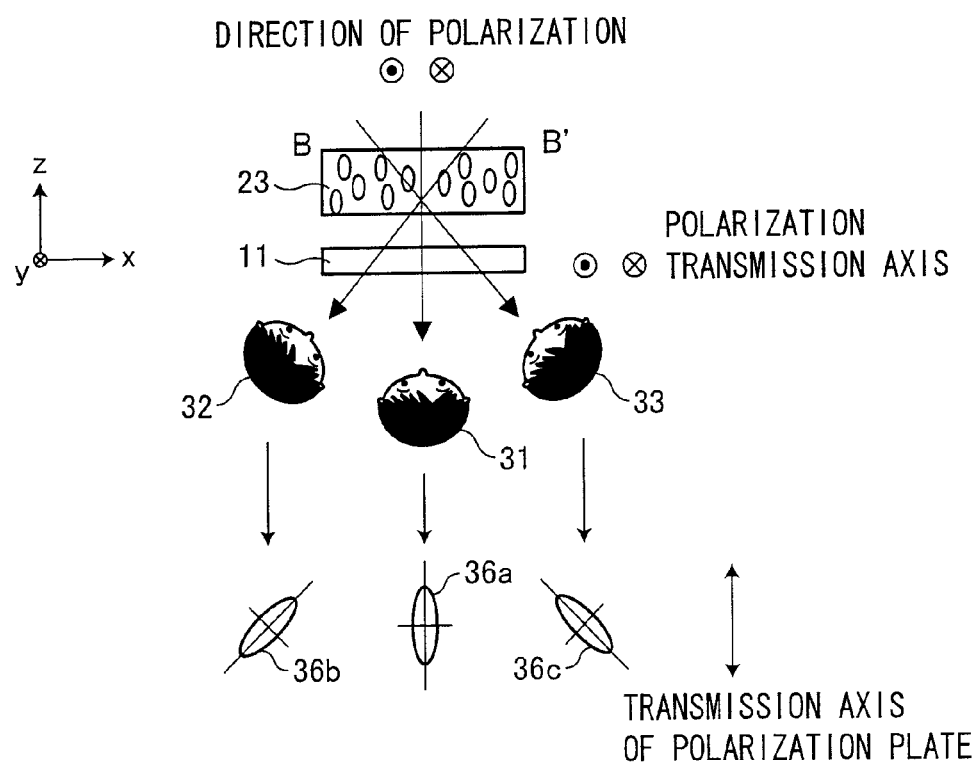

In this case, as shown in FIG. 7(b), a liquid crystal molecule 36a is a projection drawing obtained by projecting each of the liquid crystal molecules as seen from the observer 31, i.e., by projecting each of the liquid crystal molecules as seen from the front direction. The orientation of the liquid crystal molecules is changed by rotating the liquid crystal molecules on the axis of the x direction. Therefore, the respective polarization directions of the second polarization plate 11 and the first polarization plate 13 always corresponds to the long axis direction of the liquid crystal molecule 36a. For this reason, in cases where the display section 4 is seen from the front direction (in cases where the display section 4 is seen from the observer 31 of FIG. 7), the image displayed by the main LCD 14 can be directly seen without the influence of birefringence.

On the other hand, a liquid crystal molecule 36b is a projection drawing obtained by projecting each of the liquid crystal molecules as seen from an observer 32 who is on the left as he/she faces the display section 4, i.e., by projecting each of the liquid crystal molecules as seen from the left side of the substrates 21 and 22. In this case, the respective polarization directions of the second polarization plate 11 and the first polarization plate 13 are at an angle with the long axis direction of the liquid crystal molecule 36b, so that the long axis direction of the liquid crystal molecule 36b is at an angle of intersection with the direction of polarization of the incident light. Therefore, when the display section 4 is seen from the observer 32, the light does not passes through the SW-LCD 12 under the influence of birefringence of liquid crystals, so that the image displayed by the main LCD 12 cannot be seen.

Similarly, a liquid crystal molecule 36c is a projection drawing obtained by projecting each of the liquid crystal molecules as seen from an observer 33 who is on the right as he/she faces the display section 4, i.e., by projecting each of the liquid crystal molecules as seen from the right side of the substrates 21 and 22. The respective polarization directions of the second polarization plate 11 and the first polarization plate 13 are at an angle with the long axis direction of the projection drawing, so that the long axis direction of the projection drawing of the liquid crystal molecule is at an angle of intersection with the direction of polarization of the incident light. With this, the direction polarization is rotated. Therefore, when the display section 4 is seen from the observer 33, the light does not passes through the SW-LCD 14 under the influence of birefringence of liquid crystals, so that the image displayed by the main LCD 12 cannot be seen.

Because of such a mechanism, effects such as those shown in FIG. 4 are obtained when a voltage is applied to the transparent electrode films 26 and 27. That is, in cases where the display section 4 is seen from the front direction (in cases where the display section 4 is seen by the observer 31), the image displayed by the main LCD 14 can be directly seen without the influence of birefringence. In cases where the display section 4 is seen from a direction other than the front direction (in cases where the display section 4 is seen from the observers 32 and 33), the light does not passes through the SW-LCD under the influence of birefringence, so that the image displayed by the main LCD 14 becomes invisible.

Note that, in the narrow viewing angle mode, the liquid crystal molecules are not necessarily oriented in such a direction as to be tilted at 45° to the substrates 21 and 22, and that the liquid crystal molecules may be tilted at any degree as long as they are tilted with respect to the substrates 21 and 22. That is, the liquid crystal molecules only need to be tilted at an angle (i) larger than a tilt angle obtained when the liquid crystal molecules are substantially parallel to the substrates 21 and 22 and (ii) smaller than a tilt angle obtained when the liquid crystal molecules are substantially perpendicular to the substrates 21 and 22. (Specifically, the liquid crystal molecules only need to be tilted at an angle larger than 0° and smaller than 90°.) The liquid crystal molecules are preferably tilted at an angle of not less than 10° and not more than 80°, more preferably not less than 40° and not more than 50°. The reason for this is as follows: As the tilt angle approximates to 45°, the birefringence becomes larger, so that the image can be satisfactorily hidden. Further, when the tilt angle is small, a driving voltage becomes smaller, so that power consumption can be reduced.

In cases where an observer displaces himself/herself in the y direction, the long axis direction of the projection drawing of the liquid crystal molecule is not changed, so that it depends only on the displacement of the observer's eye in the x direction whether or not the main LCD 12 can be seen. Therefore, the line of sight from the front direction is the line of sight from a direction parallel to a y-z plane (i.e., a plane drawn by a point on a liquid crystal molecule as its direction of orientation is rotated to be changed).

Further, see a case where a switching image is displayed with respect to the line of sight extending in an oblique direction in the narrow viewing angle mode. In this case, the transparent electrode films 26 and 27 are used either (see FIG. 6(*a*)) or both (see FIG. 6(*b*)) of which is/are subjected to electrode pattering so as to have an electrode provided on a portion (non-transmission portion) other than a logo portion indicated by a white logo "SHARP". With this, in the logo portion of at least either of the transparent electrode films to which logo portion no voltage is applied, no voltage is applied to the liquid crystal molecules, so that the direction of orientation becomes substantially parallel to the substrates 21 and 22 as with the case where no voltage is applied. Therefore, only the logo portion is free from the influence of birefringence caused in the SW-LCD 14, regardless of the direction from which the logo portion is seen. This causes the observers 32 and 33 to see a logo image such as that displayed by the display section 4 in FIG. 6. In this logo image, the portion other than the logo portion blocks the light, and the logo portion transmits the light.

In order for the pattern electrode to hide the image displayed by the main LCD 14, it is preferable that not less than 60%, or more preferably not less than 80%, of the display section 4 be covered with an electrode.

Example 2 of the Orientation of the Liquid Crystal Molecules of the SW-LCD

Figure 8:
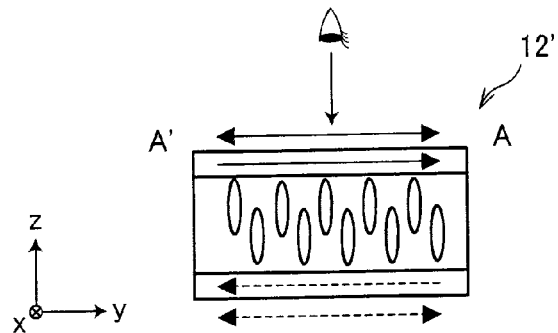
FIGS. 8(a) and 8(b) show a display section of a portable phone, according to another embodiment of the present invention, set in a single image display mode.
Figure 8:
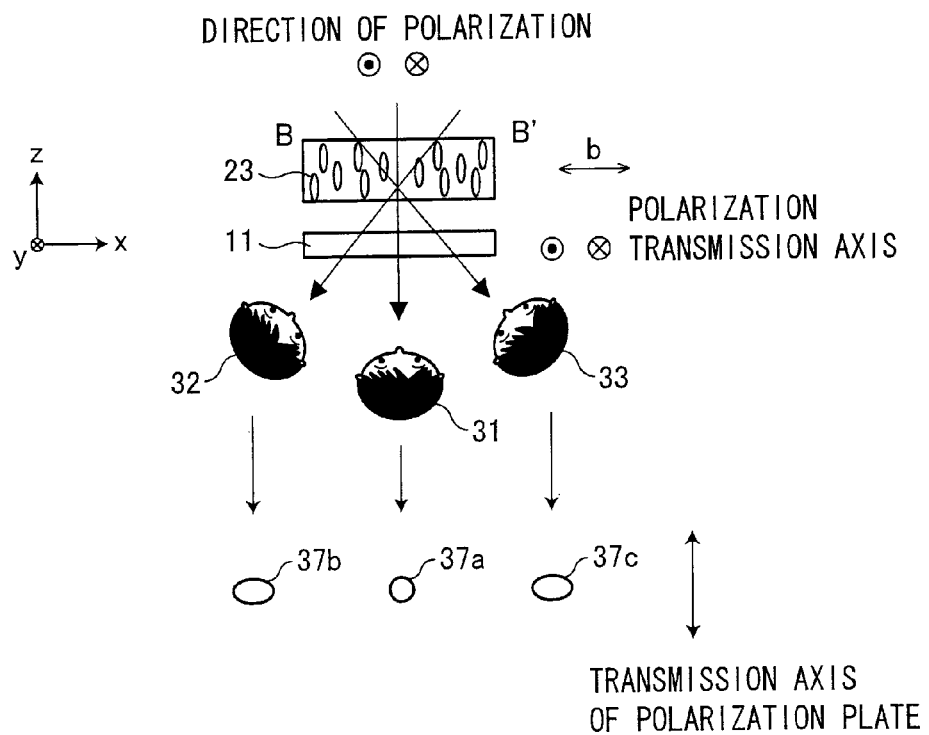

Example 2 of the orientation of the liquid crystal molecules of the SW-LCD will be described with reference to FIG. 8. Example 2 of the orientation of the liquid crystal molecules is realized by using a SW-LCD 12' obtained by replacing the orienting films 24 and 25 of the SW-LCD 12 with orienting films made of a vertical alignment polyimide material. With this, as shown in FIG. 8(*a*), the liquid crystal molecules can be oriented so as to be substantially perpendicular to the electrode substrates 21 and 22.

In this case, when no voltage is applied, the liquid crystal molecules of the SW-LCD 12' are uniaxially oriented so as to be substantially perpendicular to the substrates 21 and 22. That is, when seen from the front direction, a liquid crystal molecule 37 looks like a perfect circle (When the projection drawing looks like a perfect circle, it is assumed that any direction is a long axis direction). Moreover, when seen from a direction other than the front direction, each of the liquid crystal molecules has a long axis direction extending in the x direction, as with liquid crystal molecules 37*b* and 37*c*. Therefore, regardless of whether the liquid crystal molecule is projected from the front direction or another direction, the angle between the long axis direction b and the direction of polarization of the incident light becomes 90°. In cases where the angle between the long axis direction of the projection drawing of the liquid crystal molecule and the direction of polarization of the incident light is 90° (right angle), the incident light is transmitted without the influence of birefringence, so that the image displayed by the main LCD 14 can be directly seen regardless of the angle at which the image is observed. This state, in which no voltage is applied, is set as the wide viewing angle mode.

On the other hand, in the narrow viewing angle mode, switched from the wide viewing angle mode, an AC voltage is applied to the transparent electrode films 26 and 27 so that the liquid crystal molecules are rotated on the axis of the x direction so as to be tilted at 45° to the substrates 21 and 22. In this case, the liquid crystal molecules look in the same manner as in Example 1, shown in FIG. 7, of the orientation of the liquid crystal molecules of the SW-LCD.

Because of the same mechanism, effects such as those shown in FIG. 3 are obtained when a voltage is applied to the transparent electrode films 26 and 27. That is, in cases where the display section 4 is seen from the front direction (in cases where the display section 4 is seen by the observer 31), the image displayed by the main LCD 14 can be directly seen without the influence of birefringence. However, in cases where the display section 4 is seen from a direction other than the front direction (in cases where the display section 4 is seen by the observers 32 and 33), the logo image is seen under the influence of birefringence.

Example 3 of the Orientation of the Liquid Crystal Molecules of the SW-LCD

Figure 9A:
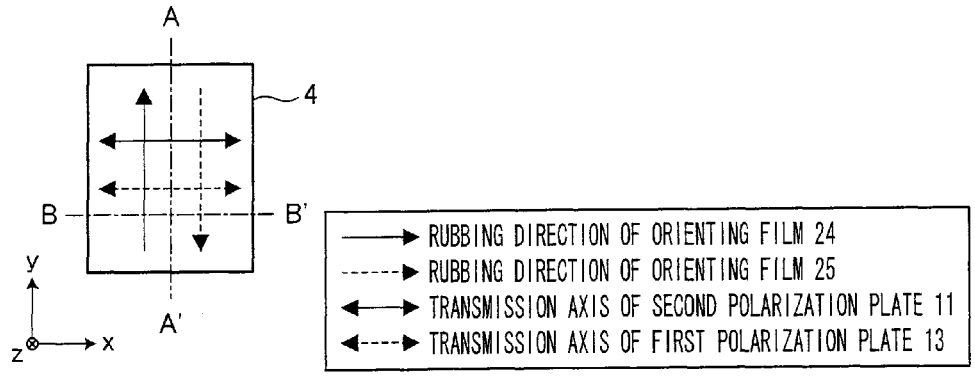
FIGS. 9(a) to 9(c) show a display section of a portable phone, according to another embodiment of the present invention, set in a single image display mode.

FIG. 9(*a*) shows the display section 4 of the portable phone 1 so that the upper and lower sides of the display screen respectively correspond to the upper and lower sides of the page.

Figure 9B:
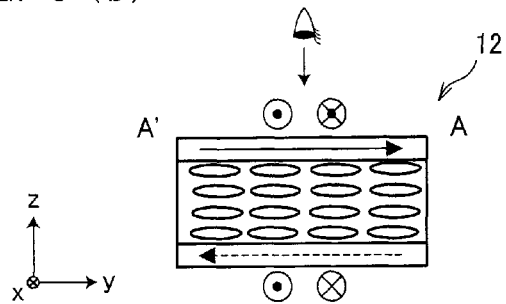

First, as shown in FIG. 9(*a*), the second polarization plate 11 and the first polarization plate 13 are provided so as to have respective polarization transmission axes extending in the x direction. Further, the respective rubbing directions of the orienting films 24 and 25 are set to be perpendicular (y direction) to the respective polarization transmission axes of the first and second polarization plates 13 and 11 so as to be reversed 180° with respect to each other. That is, the orienting films 24 and 25 are oriented in such directions as to form an antiparallel structure. Moreover, the orienting films 24 and 25 are made of a horizontal alignment polyimide material so that the liquid crystal molecules are so oriented as to be substantially parallel to the substrates 21 and 22. With this, as shown in FIG. 9(b), the liquid crystal molecules are uniaxially oriented so as to have a long axis direction substantially parallel to the respective polarization transmission axes of the polarization plates.

Figure 9C:
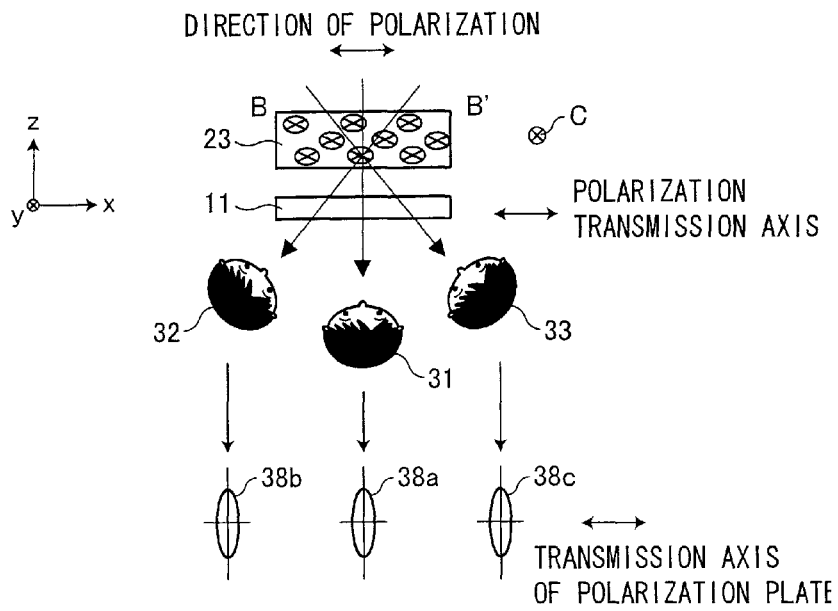

In this case, as shown in FIG. 9(b), when no voltage is applied, the liquid crystal molecules of the SW-LCD 12 are uniaxially oriented so as to be parallel to the substrates 21 and 22 and so as to be at right angle with the polarization transmission axis of the first polarization plate 13. Light incident on the SW-LCD 12 after having been emitted from the backlight 16 and having passed through the main LCD 14 passes through the first polarization plate 13. Therefore, the direction of polarization of the light incident on the SW-LCD 12 is at right angle with the direction of orientation of the liquid crystal molecules. FIG. 9(c) shows the way the liquid crystal molecules look when the SW-LCD 12 to which no voltage is applied is obliquely seen from the x direction. As shown in FIG. 9(c), a shape obtained by projecting each of the liquid crystal molecules as seen from the front direction (a shape of each of the liquid crystal molecules as seen from the observer 31) is similar to that of a liquid crystal molecule 38a, and the liquid crystal molecule thus projected has a long axis direction c at right angle with the direction of polarization of the incident light. In cases where the angle between the long axis direction of the projection drawing of the liquid crystal molecule and the direction of polarization of the incident light is 90°, the incident light is transmitted without the influence of birefringence. Therefore, the image displayed by the main LCD 14 can be directly seen regardless of the angle at which the image is observed. This state, in which no voltage is applied, is set as the wide viewing angle mode.

Figure 10:
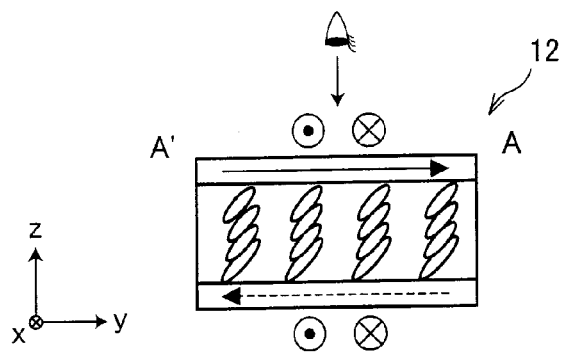
FIGS. 10(a) and 10(b) show the display section of the portable phone, according to the embodiment of the present invention, set in a multiple image display mode.
Figure 10:
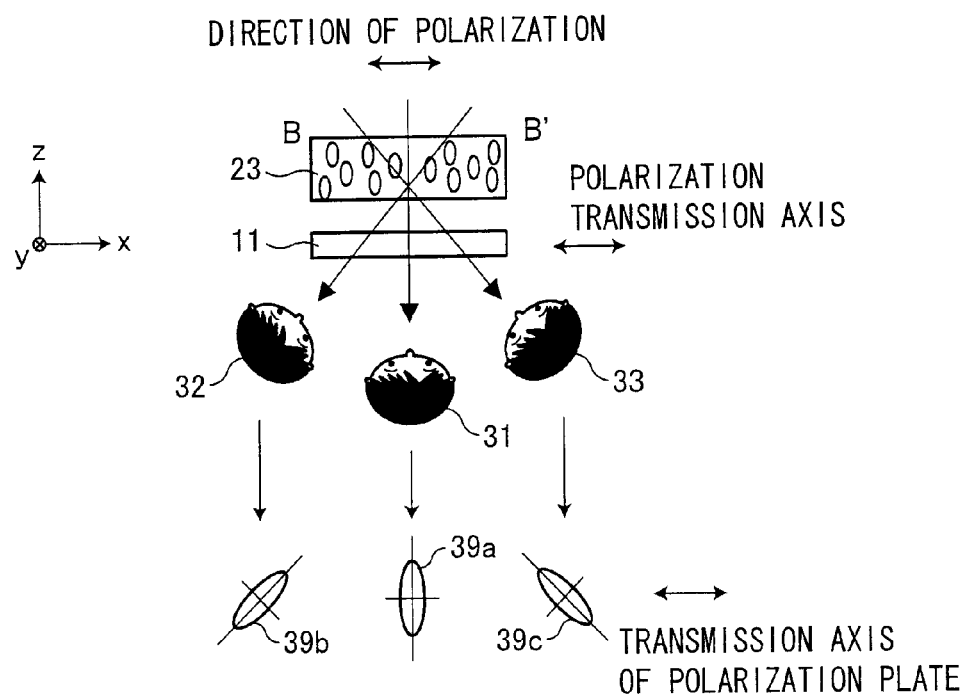

On the other hand, in the narrow viewing angle mode, an AC voltage is applied to the transparent electrode films 25 and 26, to which no voltage is applied, so that the liquid crystal molecules are rotated on the axis of the x direction so as to be tilted at 45° to the substrates 21 and 22. FIG. 10 shows the way the liquid crystal molecules look on this occasion. FIG. 10(a) is a cross-sectional view taken along the line A-A', and shows that the liquid crystal molecules are tilted at 45° to the substrates 21 and 22. FIG. 10(b) is a cross-sectional view taken along the line B-B', and shows that the liquid crystal molecules are tilted at 45° with respect to the normal of the page.

In this case, as shown in FIG. 10(b), a liquid crystal molecule 39a is a projection drawing obtained by projecting each of the liquid crystal molecules as seen from the observer 31, i.e., by projecting each of the liquid crystal molecules as seen from the front direction. The orientation of the liquid crystal molecules is changed by rotating the liquid crystal molecules on the axis of the x direction. Therefore, the respective polarization directions of the second polarization plate 11 and the first polarization plate 13 are at right angle with the long axis direction of the liquid crystal molecule 39a. Accordingly, the long axis direction of the projection drawing of the liquid crystal molecule becomes substantially perpendicular to the direction of polarization of the incident light. For this reason, in cases where the display section 4 is seen from the front direction (in cases where the display section 4 is seen from the observer 31), the image displayed by the main LCD 14 can be directly seen without the influence of birefringence.

On the other hand, a liquid crystal molecule 39b is a projection drawing obtained by projecting each of the liquid crystal molecules as seen from the observer 32 who is on the left as he/she faces the display section 4, i.e., by projecting each of the liquid crystal molecules as seen from the left side of the substrates 21 and 22. The respective polarization directions of the second polarization plate 11 and the first polarization plate 13 are at an angle with the long axis direction of the projection drawing, so that the long axis direction of the projection drawing of the liquid crystal molecule is at an angle of intersection with the direction of polarization of the incident light. Therefore, when the display section 4 is seen from the observer 32, the light does not passes through the SW-LCD 12 under the influence of birefringence of liquid crystals, so that the image displayed by the main LCD 12 cannot be seen.

Similarly, a liquid crystal molecule 39c is a projection drawing obtained by projecting each of the liquid crystal molecules as seen from an observer 33 who is on the right as he/she faces the display section 4, i.e., by projecting each of the liquid crystal molecules as seen from the right side of the substrates 21 and 22. The respective polarization directions of the second polarization plate 11 and the first polarization plate 13 are at an angle with the long axis direction of the projection drawing, so that the long axis direction of the projection drawing of the liquid crystal molecule in at an angle of intersection with the direction of polarization of the incident light. Therefore, when the display section 4 is seen from the observer 32, the light does not passes through the SW-LCD 12 under the influence of birefringence of liquid crystals, so that the image displayed by the main LCD 12 cannot be seen.

Because of such a mechanism, effects such as those shown in FIG. 4 are obtained when a voltage is applied to the transparent electrode films 26 and 27. That is, in cases where the display section 4 is seen from the front direction (in cases where the display section 4 is seen by the observer 31), the image displayed by the main LCD 14 can be directly seen without the influence of birefringence. In cases where the display section 4 is seen from a direction other than the front direction (in cases where the display section 4 is seen from the observers 32 and 33), the light does not passes through the SW-LCD under the influence of birefringence, so that the image displayed by the main LCD 14 becomes invisible.

Example 4 of the Orientation of the Liquid Crystal Molecules of the SW-LCD

Figure 11:
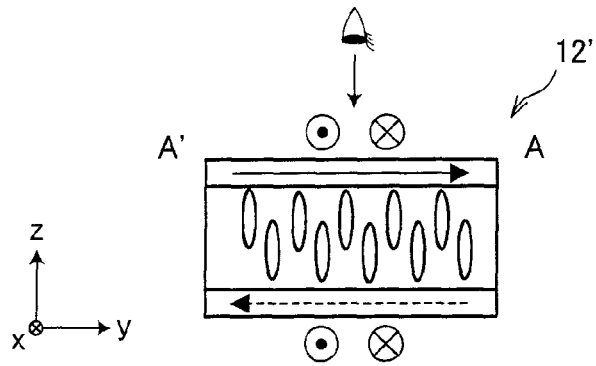
FIGS. 11(a) to 11(b) show a display section of a portable phone, according to another embodiment of the present invention, set in a single image display mode.
Figure 11:
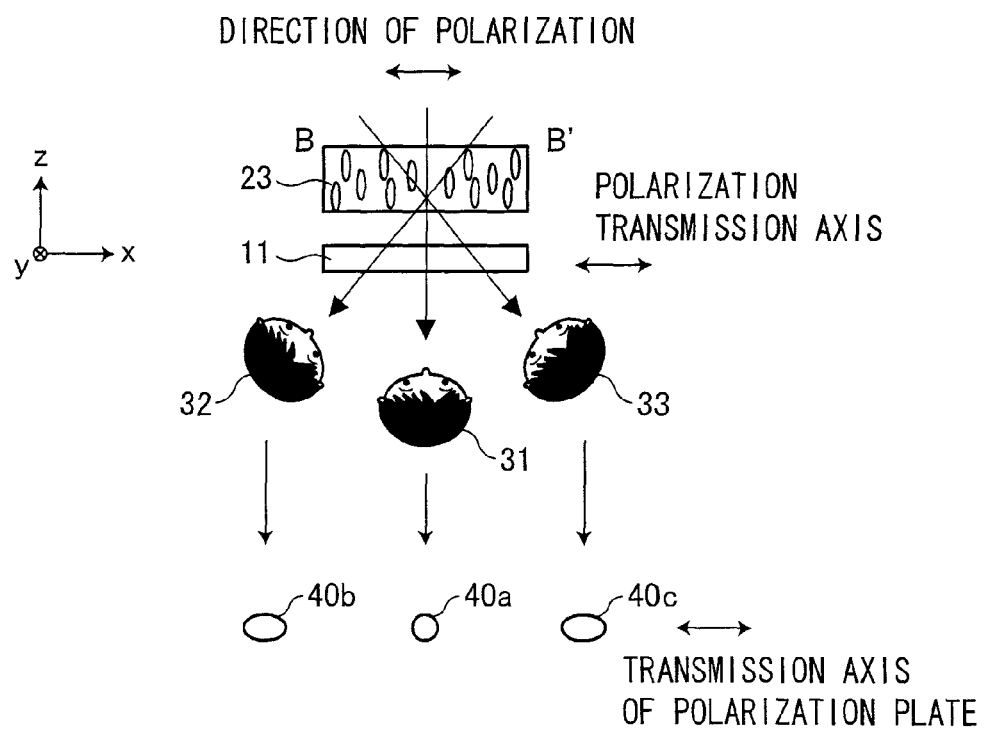

Example 4 of the orientation of the liquid crystal molecules of the SW-LCD will be described with reference to FIG. 11. Example 4 of the orientation is realized by using a SW-LCD 12' obtained by replacing the orienting films 24 and 25 of the SW-LCD of Example 3 with orienting films made of a vertical alignment polyimide material. With this, the liquid crystal molecules can be oriented so as to be substantially perpendicular to the substrates 21 and 22.

In this case, when no voltage is applied, the liquid crystal molecules of the SW-LCD 12' are uniaxially oriented so as to be substantially perpendicular to the substrates 21 and 22. That is, as shown in FIG. 11(b), when seen from the front direction, a liquid crystal molecule 37 looks like a perfect circle. Moreover, when seen from a direction other than the front direction, each of the liquid crystal molecule seems to have a long axis direction extending in the x direction, as with liquid crystal molecules 40b and 40c. Therefore, regardless of whether the liquid crystal molecule is projected from the front direction or another direction, the long axis direction and the direction of polarization of the incident light correspond to each other. In cases where the angle between the long axis direction of the projection drawing of the liquid crystal molecule and the direction of polarization of the incident light is 0° (parallel), the incident light is transmitted without the influence of birefringence, so that the image displayed by the main LCD 14 can be directly seen regardless of the angle at which the image is observed. This state, in which no voltage is applied, is set as the wide viewing angle mode.

On the other hand, in the narrow viewing angle mode, switched from the wide viewing angle mode, an AC voltage is applied to the transparent electrode films 26 and 27 so that the liquid crystal molecules are rotated on the axis of the x direction so as to be tilted at 45° to the substrates 21 and 22. In this case, the liquid crystal molecules look in the same manner as in Example 1, shown in FIG. 10, of the orientation of the liquid crystal molecules of the SW-LCD.

Because of the same mechanism, effects such as those shown in FIG. 4 are obtained when a voltage is applied to the transparent electrode films 26 and 27. That is, in cases where the display section 4 is seen from the front direction (in cases where the display section 4 is seen by the observer 31), the image displayed by the main LCD 14 can be directly seen without the influence of birefringence. However, in cases where the display section 4 is seen from a direction other than the front direction (in cases where the display section 4 is seen by the observers 32 and 33), the logo image is seen under the influence of birefringence.

Transmittance Measurement Experiment

The SW-LCDs of Examples 1 and 3 of the orientation of the liquid crystal molecules were used to measure how the transmittance is changed in accordance with the viewing angle in the multiple image display mode. The results are shown in FIGS. 12 and 13.

Figure 12:
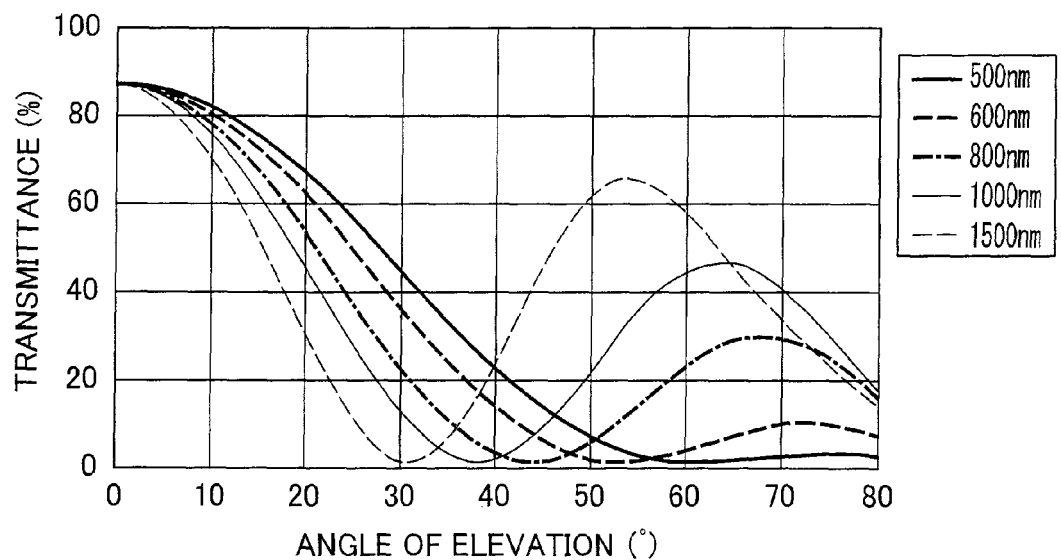
FIG. 12 is a diagram showing a relationship between the angle of elevation of the line of sight and the transmittance in a SW-LCD according to an embodiment of the present invention.
Figure 13:
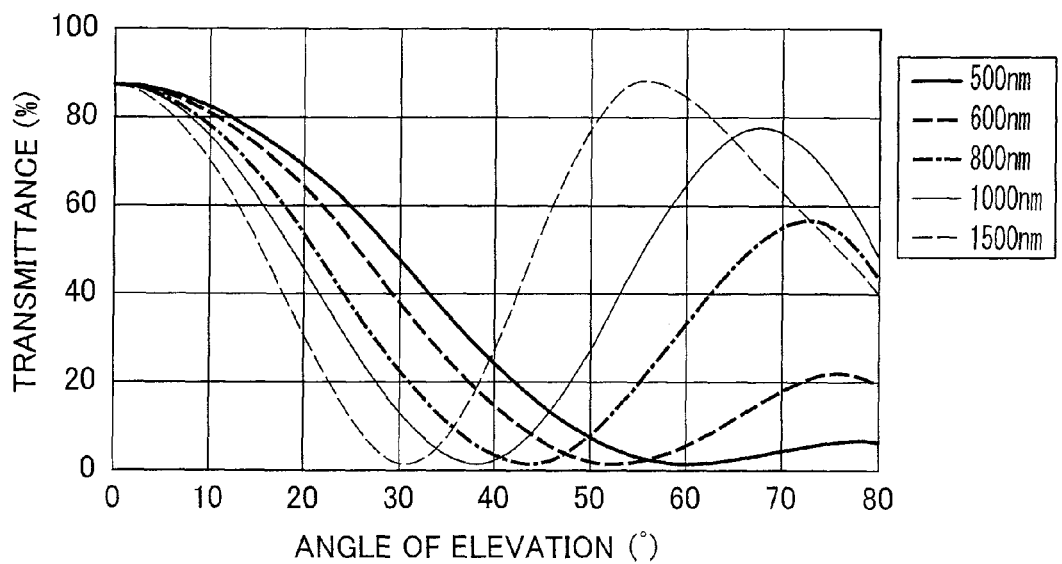
FIG. 13 is a diagram showing a relationship between the angle of elevation of the line of sight and the transmittance in a SW-LCD according to another embodiment of the present invention.

FIG. 12 is a graph showing a result of measurement performed when the SW-LCD of Example 1 of the orientation of the liquid crystal molecules is set in the multiple image display mode. The measurement was performed in the following manner. That is, the first polarization plate was provided so as to have a polarization transmission axis extending in an up-and-down direction, and the point of view was displaced in a right-and-left direction without changing a target point to be seen through the line of sight (the angle of elevation of 0°) extending in a direction (the direction of a normal) perpendicular to the display section 4. The point of view was displaced until the angle between the direction perpendicular to the display section 4 and the line of sight becomes 80° (i.e., until the angle of elevation changes from 0° to 80°). Then, the angle of elevation of the line of sight and the transmittance of the SW-LCD as seen through the line of sight were measured. In the graph, the horizontal axis represents the angle of elevation, and the vertical axis represents the transmittance. Further, the measurement was performed using SW-LCDs respectively having retardations of 500 nm, 600 nm, 800 nm, 1000 nm, and 1500 nm when seen from the front direction.

According to this, each of the SW-LCDs exhibited a maximum transmittance of approximately 85% with an angle of elevation of 0°, and exhibited a lower transmittance as the angle of elevation was increased. The SW-LCD having a retardation of 1500 nm exhibited a transmittance of approximately 0% with an angle of elevation of approximately 30°, and exhibited a higher transmittance again when the angle of elevation was further increased. The SW-LCD having a retardation of 1000 nm exhibited a transmittance of approximately 0% with an angle of elevation of approximately 38°, and the SW-LCD having a retardation of 800 nm exhibited a transmittance of approximately 0% with an angle of elevation of approximately 44°. Further, the SW-LCD having a retardation of 600 nm exhibited a minimum transmittance with an angle of elevation of approximately 50°, and only exhibited a transmittance of not more than 10% even when the angle of elevation was further increased. Similarly, the SW-LCD having a retardation of 500 nm exhibited a minimum transmittance with an angle of elevation of approximately 60°, and only exhibited a transmittance of not more than 10% even when the angle of elevation was further increased.

The retardation of a SW-LCD is determined in accordance with the extent to which the transmittance needs to be reduced. The extent of necessary reduction in transmittance is determined in accordance with the direction from which a main LCD is not allowed to be seen or in consideration of the use environment, the luminance of the main LCD, and the like. For example, in cases where the image displayed by the main LCD needs to be hidden with respect to the line of sight having an angle of elevation of approximately 45°, a SW-LCD having a retardation of 500 nm to 1000 nm may be used because it exhibits a low transmittance at this angle of elevation. In cases where the image displayed by the main LCD needs to be hidden mainly with respect to the line of sight having an angle of elevation of 30° to 50°, a SW-LCD having a retardation of 800 nm to 1000 nm may be used because it exhibits a low transmittance in this range of angle of elevation. On the other hand, in cases where the image displayed by the main LCD needs to be hidden with respect to the line of sight having an angle of elevation of larger than 40°, a SW-LCD having a retardation of 500 nm to 600 nm may be used because it exhibits a low transmittance in this range of angle of elevation.

Further, FIG. 13 is a graph showing a result of measurement performed when the SW-LCD of Example 3 of the orientation of the liquid crystal molecules is similarly set in the multiple image display mode. As compared with FIG. 12, the transmittance is even higher when the angle of elevation is large. Therefore, as with Example 1 of the orientation of the liquid crystal molecules, it is preferable that the liquid crystal molecules have a long axis direction substantially parallel to the polarization transmission axes. Note that: the features of the curves are similar to those of the curves of FIG. 12, so that an optimum retardation may be chosen in the same manner.

According to the SW-LCD 12, regardless of which of the arrangements of Examples 1 to 4 of the orientation of the liquid crystal molecules is used, the image displayed by the display section 4 can be seen in the wide viewing angle mode in which no voltage is applied to the transparent electrode films 26 and 27. The reason for this is as follows: In the wide viewing angle mode, no birefringence occurs in the liquid crystal molecules regardless of whether the screen is seen from the front direction or an oblique direction, so that the incident light passes through the liquid crystal layer 23 and the second polarization plate 11.

Further, in the narrow viewing angle mode in which a voltage is applied to the transparent electrode films 26 and 27, the image displayed by the display section 4 becomes invisible. The reason for this is as follows: In the narrow viewing angle mode, birefringence occurs in the liquid crystal molecules when the screen is seen from an oblique direction, so that a change in the direction of polarization of light having passed through the liquid crystal layer 23 makes it impossible to allow the light to pass through the second polarization plate 11.

However, as evidenced by the results shown in FIGS. 12 and 13, according to the arrangement in which the wide viewing angle mode and the narrow viewing angle mode are switched back and forth by using a SW-LCD according to the present embodiment, the image displayed by the display section 4 is not necessarily completely blocked when seen from an oblique direction.

For example, according to the result shown in FIG. 12, in cases where the image displayed by the main LCD needs to be hidden with respect to the line of sight having an angle of elevation of 30° to 50°, a SW-LCD, having a retardation of 500 nm to 600 nm, which exhibits a low transmittance in the range of angle of elevation may be used as described above. However, even in this case, although it is possible to attain a transmittance of approximately 0% with respect to the line of sight having an angel of elevation of approximately 40°, the transmittance is reduced to approximately 20% when the angle of elevation of the line of sight is 30° or 50°. For this reason, depending on viewing directions, the image displayed by the display section 4 cannot be blocked completely. Especially in cases where an image having a high contrast ratio is displayed, there occurs such a problem that the image can be slightly seen even from an oblique direction.

In response to this problem, the SW-LCD 12 according to the present embodiment is arranged so as to have a non-transmission region in which a mirror surface display is carried out, instead of a black display, in the narrow viewing angle mode with respect to the line of sight extending from an oblique direction. With this, image visibility is reduced (the content of an image is made hard to recognize). That is, image visibility can be reduced by carrying out a mirror surface display in the non-transmission region, although the image displayed by the main LCD cannot be completely blocked in the non-transmission region. This is because an image formed by outside light is superimposed on the image displayed by the main LCD.

Here, the SW-LCD has a non-transmission region in which a mirror surface display is carried out in the narrow viewing angle mode with respect to the line of sight extending from an oblique direction. This is realized by using a reflective polarization plate as the polarization plate provided between the SW-LCD 12 and the main LCD 14 in FIG. 1, i.e., as the first polarization plate 13. Note that a reflective polarization plate is a polarization plate having a polarization transmission axis and a polarization reflection axis orthogonal to the polarization transmission axis, and has a function of reflecting light polarized in parallel with the polarization reflection axis.

Figure 14:
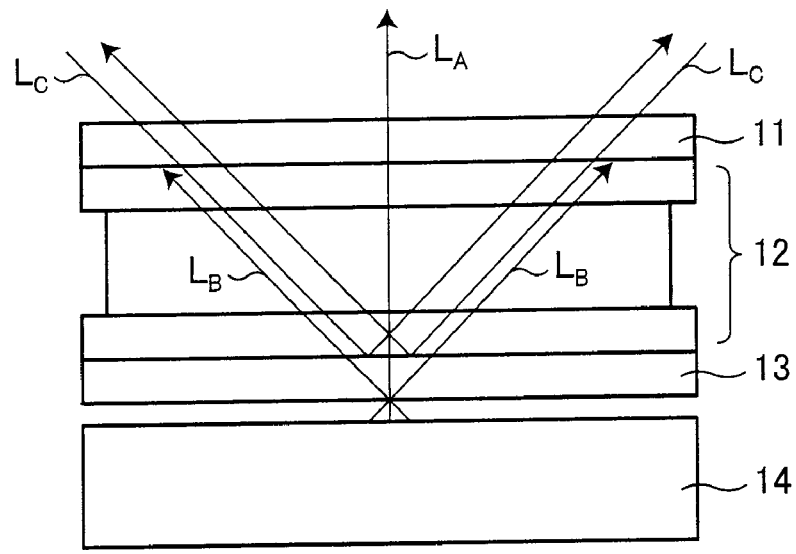
FIG. 14 is a cross-sectional view showing how a display section according to an embodiment of the present invention is operated in a narrow viewing angle mode.

Thus, as shown in FIG. 14, in cases where the first polarization plate 13 is a reflective polarization plate, light emitted from the main LCD 14 in the narrow viewing angle mode contains frontward light $L_A$ and obliquely directed light $L_B$. The light $L_A$ passes through the first polarization plate 13, the SW-LCD 12, and the second polarization plate 11 so as to be viewable to the observer, so that image information is displayed by the main LCD 14. Further, the light $L_B$ is blocked (absorbed) by the second polarization plate 11.

Meanwhile, outside light incident on the display section 4 from an oblique direction is made to be linear polarized light by the second polarization plate 11, and the direction of polarization is rotated due to oblique birefringence of the SW-LCD 12. Therefore, light coming as outside light onto the display section 4 from an oblique direction has its polarization component reflected by the first polarization plate 11 in parallel with the polarization reflection axis of the first polarization plate 13, and is emitted in the opposite oblique direction. This makes it possible to obtain a mirror surface display in the non-transmission region of the SW-LCD 12.

According to the foregoing arrangement, the first polarization plate 13 is a reflective polarization plate. However, a reflective polarization plate usable under the present set of circumstances has a low degree of polarization as compared with an absorptive polarization plate normally used as a polarization plate. For this reason, as shown in FIG. 15, it is preferable, in practice, that an absorptive polarization plate 18 having a higher degree of polarization be provided on a back surface side (a side facing the backlight) of the first polarization plate 13 serving as a reflective polarization plate.

Figure 15:
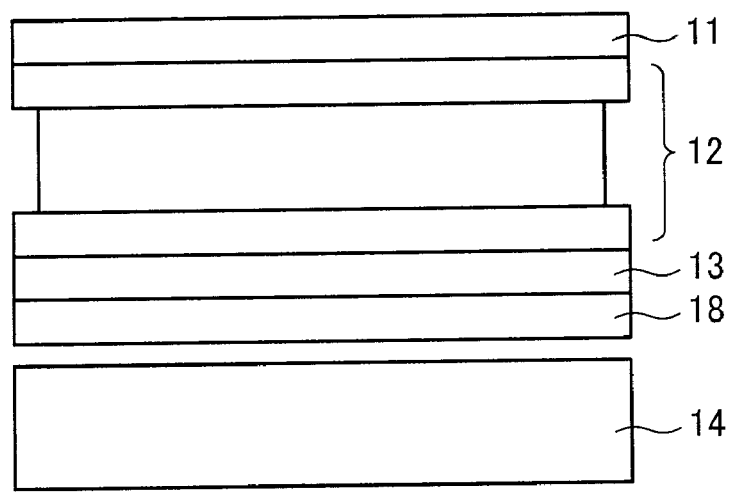
FIG. 15 is a cross-sectional view of a modified example of a display section according to an embodiment of the present invention.

In FIGS. 14 and 15, the transparent electrode films and orienting films of the SW-LCD 12 and main LCD 14 are omitted.

A display device of the present invention is arranged so as to be set to the single image display mode when no voltage is applied to the transparent electrode films, and so as to be set to the multiple image display mode when a certain voltage is applied to the transparent electrode films. However, the display device may be arranged so as to be set to the multiple image display mode when no voltage is applied to the transparent electrode films, and so as to be set to the single image display mode when a certain voltage is applied to the transparent electrode films. This arrangement is realized by (i) tilting in advance the liquid crystal molecules, for example, at 45° with respect to the substrates, and by (ii) applying a voltage to the liquid crystal molecules so that the liquid crystal molecules are oriented so as to be substantially perpendicular or substantially parallel to the substrates. According to such an arrangement, power consumption can be reduced in cases where the multiple image display mode (narrow viewing angle mode) is often used. However, in this case, when the display device is seen from an oblique direction in the narrow viewing angle mode, the display device displays an image whose whole area is a non-transmission region, instead of an image having a logo or the like therein.

Further, in order for the display device to display a logo when the display device is seen from a lateral direction in the narrow viewing angle mode, the SW-LCD 12 is provided with an electrode pattern molded to the shape of a logo, and in the multiple image display mode, the orientation of the liquid crystal molecules is changed in accordance with a position corresponding to the electrode pattern. However, the SW-LCD 12 may be driven by a matrix method. For example, the orientation of liquid crystal molecules corresponding to each pixel of the SW-LCD 12 may be controlled by a TFT (thin-film transistor) switching of the pixel. In this case, a video signal is supplied to the SW-LCD 12, and the orientation of liquid crystal molecules is changed in a region corresponding to the video signal. Therefore, it is possible to superimpose any image or any moving image onto the image displayed by the main LCD 14.

Furthermore, according to the display device of the present embodiment, the viewing angle is controlled so that the image displayed by the main LCD 14 cannot be seen from an oblique direction (from the right or left) as the viewer directly faces the image. However, the present invention is not limited to this. The viewing angle may be controlled so that the image cannot be seen from an obliquely upward direction or from an obliquely downward direction.

In order to realize this arrangement, it is only necessary to join the image display means and the display switching means on top of each other so that the right-and-left direction of the image displayed by the image display means is substantially parallel to a plane drawn by a point on a liquid crystal molecule as its orientation is changed.

Figure 16:
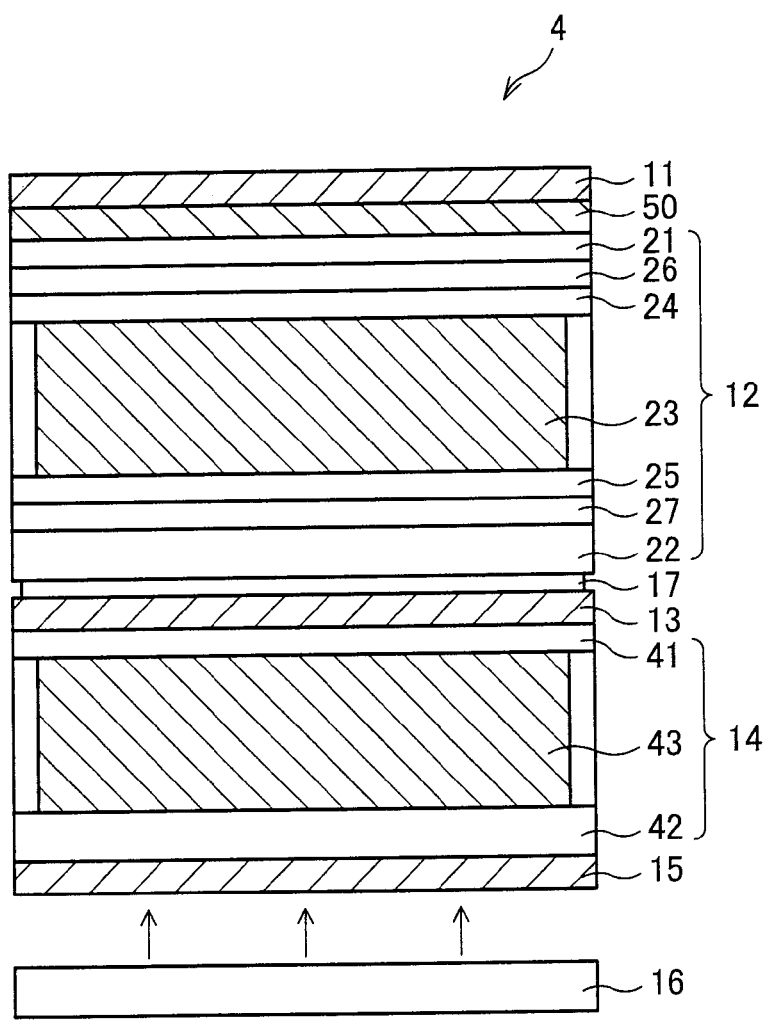
FIG. 16 is a cross-sectional view of a display section of a portable phone according to an embodiment of the present invention.

Further, according to the display device of the present embodiment, the respective polarization transmission axes of the first and second polarization plates 13 and 11 are identical to each other in terms of their directions. However, as shown in FIG. 16, even in cases where the polarization transmission axes are at an angle with each other, the same functions can be obtained by disposing, between the second polarization plate 11 and the substrate 21, a polarization rotation member 50 for rotating the direction of polarization of incident light. That is, the polarization rotation member 50 rotates the direction of polarization of linear polarized light emitted from a liquid crystal molecule, thereby producing linear polarized light such as that extracted by the second polarization plate 11. With this, even when the respective polarization transmission axes of the first and second polarization plates 13 and 11 do not correspond to each other, it is possible to cause the second polarization plate 11 to extract the linear polarized light emitted from the liquid crystal molecule. Examples of the polarization rotation member 50 include a ½λ plate (wave plate).

Note that: as long as the polarization rotation member 50 is provided between the first and second polarization plates 13 and 11, the polarization rotation member 50 may be provided so as to be closer to a light-receiving side than is the liquid crystal layer, or the polarization rotation member 50 may be provided so as to be closer to a light-emitting side than is the liquid crystal layer. Further, the polarization rotation member 50 may be provided so as to be closer to the light-receiving side than is the first polarization plate 13.

Further, the present embodiment explains a case where the present invention is applied to a liquid crystal display section of a portable phone. However, the present invention is not limited to this, and can be applied to a portable electronic apparatus, such as a mobile personal computer, audio-video equipment, or a DVD player, which has a display device. Alternatively, the present invention may be applied to a non-portable display device so as to be used as a display capable of carrying out different displays in accordance with different viewing directions.

As described above, a display device according to the present invention is a display device, including: image display means for displaying an image; and display switching means, provided on a front surface side of the image display means, for electrically switching between (i) an image to be seen in a single image display mode and (ii) an image to be seen in a multiple image display mode, the display switching means being a liquid crystal layer provided between a pair of substrates, the display switching means further including (a) first polarizing means provided between the display switching means and the image display means and (b) second polarizing means provided on a front surface side of the display switching means, the first polarizing means being a reflective polarization plate.

According to the foregoing arrangement, in the multiple image display mode (narrow viewing angle mode), the image displayed by the image display means passes through the first and second polarizing means, so that the image is observable when it is seen from the front direction. When the image is seen from an oblique direction, the image can be blocked by the second polarizing means.

Further, on this occasion, outside light coming from an oblique direction can be reflected by the second polarizing means serving as a reflective polarization plate. Therefore, in the multiple image display mode (narrow viewing angle mode), a mirror surface display can be carried out with respect to the line of sight extending from an oblique direction.

Further, the display device can be arranged such that: the liquid crystal layer has liquid crystal molecules whose long axis direction that is always substantially parallel or substantially perpendicular to a polarization direction of linear polarized light incident on the liquid crystal molecules, the long axis direction being a direction obtained when the liquid crystal molecules are projected from a direction perpendicular to the substrates; in the single image display mode, at least part of the liquid crystal molecules of the liquid crystal layer is oriented so as to have a long axis direction substantially parallel or substantially perpendicular to the substrates; and in the multiple image display mode, at least part of the liquid crystal molecules of the liquid crystal layer is oriented so as to have a long axis direction tilted with respect to the substrates.

According to the foregoing arrangement, the long axis direction of the liquid crystal molecules of the liquid crystal layer is included in a surface defined by a transmission axis or an absorption axis of the first polarizing means and a light traveling direction, and the liquid crystal molecules can be (i) in a state of substantially perpendicular or substantially parallel to the light traveling direction or (ii) in a state of being tilted with respect to the light traveling direction. The statement "the liquid crystal molecules are tilted" as used herein means that the long axis direction of the liquid crystal molecules is neither parallel nor perpendicular to a direction or a plane.

In other words, in the single image display mode, the long axis direction of a liquid crystal molecule of the liquid crystal layer is substantially parallel to the substrates, and is substantially parallel or substantially perpendicular to the polarization transmission axis of the first polarizing means. In the multiple image display mode, switched from the single image display mode, the long axis direction is tilted toward a direction perpendicular to the substrates. Alternatively, in the single image display mode, the long axis direction of a liquid crystal molecule of the liquid crystal layer is substantially perpendicular to the substrates. In the multiple image display mode, switched from the single image display mode, the long axis direction is tilted in a surface substantially parallel or substantially perpendicular to the polarization transmission axis of the first polarizing means and perpendicular to the substrates.

According to this, the first polarizing means causes light incident on the display switching means to be linear polarized light having a fixed polarization direction. Further, in the liquid crystal layer of the display switching means, the long axis direction of a liquid crystal molecule projected from a direction perpendicular to the substrates is oriented so as to be always substantially parallel or substantially perpendicular to the direction of polarization of light having passed through the first polarizing means.

In cases where the direction of polarization of light incident on the liquid crystal layer is parallel or perpendicular to the long axis direction of a liquid crystal molecule projected from a certain direction, no birefringence occurs when the liquid crystal layer is seen from that direction. Therefore, regardless of which of the modes is selected, no birefringence occurs when the liquid crystal layer is seen from a direction parallel to a plane drawn by a point on a liquid crystal molecule as its orientation is changed (such direction being hereinafter referred to as "front direction"). Therefore, for example, the image displayed by the image display device can be seen by using the second polarizing means to extract linear polarized light having a direction identical to that of linear polarized light emitted by the first polarizing means. The extraction can be carried out (i) by setting the respective polarization transmission axes of the first and second polarizing means in the same direction, or (ii) by providing a member which (i) rotates the direction of polarization so that linear polarized light emitted from the first polarizing means corresponds to the transmission axis of the second polarizing means, and then (ii) causes the linear polarized light to be incident on the second polarizing means.

An image to be seen in the signal image display mode and an image to be seen in the multiple image display mode are different from each other when the images are seen from a direction other than the front direction (such direction being hereinafter referred to as "oblique direction").

In the single image display mode, the long axis direction of a liquid crystal molecule is substantially parallel or substantially perpendicular to the substrates, so that the long axis direction of a liquid crystal molecule projected from an oblique direction is identical to that of a liquid crystal molecule projected from the front direction. Therefore, no birefringence occurs in a liquid crystal molecule when the liquid crystal molecule is seen from an oblique direction, so that incident light can pass through the liquid crystal layer and the second polarization means. This makes it possible to see the image displayed by the image display means.

On the other hand, in the multiple image display mode, the long axis direction of a liquid crystal molecule is tilted with respect to the substrates, so that the long axis direction of a liquid crystal molecule projected from an oblique direction is at an angle of intersection with the direction of polarization of incident light. Therefore, birefringence occurs in a liquid crystal molecule when the liquid crystal molecule is seen from an oblique direction. This causes a change in the direction of polarization of light having passed through the liquid crystal layer, so that it becomes impossible to cause the light to pass through the second polarizing means. This makes it impossible to see the image displayed by the image display means.

Therefore, the image displayed by the image display means can be seen from any direction in the single image display mode, and can only be seen from a specific direction in the multiple image display mode. This allows the display device to change the viewing angle in accordance with a situation such as a situation where a confidential document needs to be browsed in a public place or a situation where a shot image needs to be viewed by a large number of people.

Further, according to such an arrangement, the viewing angle is controlled by controlling birefringence. Therefore, the display quality of the image display means can be satisfactorily retained with a simple arrangement.

However, according to such an arrangement, the image displayed by the image display means is not necessarily completely blocked when seen from an oblique direction in the multiple image display mode. Especially in cases where an image having a high contrast ratio is displayed, there occurs such a problem that the image can be slightly seen even from an oblique direction. In response to this problem, the adoption of the foregoing arrangement in which a mirror surface display is carried out in a non-transmission region with respect to the line of sight extending from an oblique direction in the multiple image display mode is effective in reducing image visibility (making it hard to recognize the content of an image).

Further, the display is preferably arranged such that the first polarizing means has an absorptive polarization plate further provided on a back surface side thereof.

A reflective polarization plate usable under the present set of circumstances has a low degree of polarization as compared to an absorptive polarization plate normally used as a polarization plate. For this reason, the degree of polarization of the first polarizing means serving as a reflective polarization plate can be supplemented by disposing, on a back surface side of the first polarizing means, an absorptive polarization plate having a higher degree of polarization.

Further, the display device can be arranged such that: at least one of the pair of substrates of the display switching means includes a pattern electrode having a specific shape; and a direction of orientation of the liquid crystal molecules is changed in a region receiving a voltage applied to the pattern electrode.

According to the foregoing arrangement, when the single image display mode and the multiple image display mode are switched back and forth, only those liquid crystal molecules which receive a voltage applied to the pattern electrode have their direction of orientation changed. Therefore, the region in which the direction of orientation is changed corresponds to the specific shape of the pattern electrode. Moreover, in a region in which the direction of orientation is not changed, the image displayed by the image display means can be seen even from an oblique direction regardless of the modes. Therefore, in cases where the switching image is seen from an oblique direction in the multiple image display mode, the switching image is seen as an image having a specific shape corresponding to the pattern electrode. For example, in cases where the multiple image display mode is selected in accordance with the application of a voltage to the pattern electrode, an image in which the switching image pops up from a mirror surface image is seen.

Further, a viewing angle control device of the present invention is a viewing angle control device in which outputting is carried out by controlling a viewing angle of incident light, the viewing angle control device, including: a liquid crystal element which includes a liquid crystal layer provided between a pair of substrates; first polarizing means provided on a back surface side of the liquid crystal element; and second polarizing means provided on a front surface side of the liquid crystal element, the liquid crystal element having liquid crystal molecules whose long axis direction is included in a surface defined by a transmission axis or an absorption axis of the linear polarization plate and a light traveling direction, the liquid crystal molecules being able to be (a) in a state of being substantially perpendicular or substantially parallel to the light traveling direction or (b) in a state of being tilted with respect to the light traveling direction, the first polarizing means being a reflective polarization plate.

A display device having functions such as those described above can be obtained by attaching such a viewing angle control device to a commonly-used display device.

An electronic apparatus of the present invention includes such a display device or such a viewing angle control device.

This makes it possible to realize an electronic apparatus which has a simple arrangement, which retains display quality, and which makes it possible to switch to such a mode that a display image is hidden when seen from a specific direction.

The present invention is not limited to the description of the embodiments above, but may be altered by a skilled person within the scope of the claims. An embodiment based on a proper combination of technical means disclosed in different embodiments is encompassed in the technical scope of the present invention.

A display device of the present invention can be set to a mode in which different images are seen depending on viewing directions, and therefore can be applied, for example, to a display of a portable electronic apparatus such as a portable communication terminal, a mobile personal computer, audio-video equipment, or a DVD player.

The invention claimed is:

1. A display device, comprising:
   image display device arranged to display an image; and
   a display switching device, provided on a front surface side of the image display device, and arranged to electrically switch between (i) an image to be seen in a single image display mode in which a main image displayed by the image display device is viewable from both a front direction and an oblique direction and (ii) an image to be seen in a multiple image display mode in which the main image displayed is viewable from the front direction and an image different from the main image is viewable from the oblique direction; wherein the display switching device is a liquid crystal layer provided between a pair of substrates; and the display switching device further includes (a) a first polarizing device provided between the display switching device and the image display device and (b) a second polarizing device provided on a front surface side of the display switching device, the first polarizing device being a reflective polarization plate.

2. The display device as set forth in claim 1, wherein:

the liquid crystal layer includes liquid crystal molecules whose long axis direction that is always substantially parallel or substantially perpendicular to a polarization direction of linear polarized light incident on the liquid crystal molecules, the long axis direction being a direction obtained when the liquid crystal molecules are projected from a direction perpendicular to the pair of substrates;

in the single image display mode, at least part of the liquid crystal molecules of the liquid crystal layer is oriented so as to have a long axis direction substantially parallel or substantially perpendicular to the pair of substrates; and in the multiple image display mode, at least part of the liquid crystal molecules of the liquid crystal layer is oriented so as to have a long axis direction tilted with respect to the pair of substrates.

3. The display device as set forth in claim 1, wherein the first polarizing device includes an absorptive polarization plate further provided on a back surface side thereof.

4. The display device as set forth in claim 2, wherein:

at least one of the pair of substrates of the display switching device includes a pattern electrode including a specific shape; and a direction of orientation of the liquid crystal molecules is changed in a region receiving a voltage applied to the pattern electrode.

5. A viewing angle control device in which outputting is carried out by controlling a viewing angle of incident light, the viewing angle control device, comprising:

a liquid crystal element which includes a liquid crystal layer provided between a pair of substrates;

a first polarizing device provided on a back surface side of the liquid crystal element; and a second polarizing device provided on a front surface side of the liquid crystal element; wherein the liquid crystal element includes liquid crystal molecules whose long axis direction is included in a plane defined by a transmission axis or an absorption axis of the first polarizer and the second polarizer and a light traveling direction;

the liquid crystal molecules being able to be (a) in a state of being substantially perpendicular or substantially parallel to the light traveling direction or (b) in a state of being tilted with respect to the light traveling direction;

the first polarizing device is a reflective polarization plate;

the viewing angle control device is arranged and programmed to operate in:

a first state in which a voltage is either applied or not applied such that the liquid crystal layer transmits light in both a front direction and an oblique direction; and a second state, different from the first state, in which a voltage is either applied or not applied such that the liquid crystal layer transmits light in the front direction but does not transmit light in the oblique direction.

6. An electronic apparatus, comprising a display apparatus as set forth in claim 1.

7. An electronic apparatus, comprising a viewing angle control device as set forth in claim 5.

\* \* \* \* \*